(12) United States Patent
Kelly et al.

(10) Patent No.: US 9,562,472 B2
(45) Date of Patent: Feb. 7, 2017

(54) OXYGEN TRANSPORT MEMBRANE REACTOR BASED METHOD AND SYSTEM FOR GENERATING ELECTRIC POWER

(71) Applicants: Sean M. Kelly, Pittsford, NY (US); Shrikar Chakravarti, East Amherst, NY (US); Juan Li, Clarence, NY (US)

(72) Inventors: Sean M. Kelly, Pittsford, NY (US); Shrikar Chakravarti, East Amherst, NY (US); Juan Li, Clarence, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 14/619,260

(22) Filed: Feb. 11, 2015

(65) Prior Publication Data

US 2015/0226118 A1    Aug. 13, 2015

Related U.S. Application Data

(60) Provisional application No. 61/939,029, filed on Feb. 12, 2014, provisional application No. 61/980,149, filed on Apr. 16, 2014.

(51) Int. Cl.
*B01D 53/22* (2006.01)
*F02C 3/22* (2006.01)
(Continued)

(52) U.S. Cl.
CPC .............. *F02C 3/22* (2013.01); *B01D 53/228* (2013.01); *C01B 3/382* (2013.01); *C01B 3/48* (2013.01);
(Continued)

(58) Field of Classification Search
CPC . B01D 53/22; B01D 53/228; B01D 2257/104; F02C 3/22; F02C 3/28; F02C 7/22; C01B 3/382; C01B 3/48; C01B 2203/0244; C01B 2203/0415; C01B 2203/06; C01B 2203/1241; C01B 2203/84; C01B 2203/86
(Continued)

(56) References Cited

U.S. PATENT DOCUMENTS 2,593,507 A    4/1952  Wainer
2,692,760 A   10/1954  Flurschutz
(Continued)

FOREIGN PATENT DOCUMENTS

DE       10330859 A1    2/2004
DE    102004038435 A1    2/2006
(Continued)

OTHER PUBLICATIONS

Lee Rosen, Nick Degenstein; Minish Shah; Jamie Wilson; Sean Kelly; John Peck; and Max Christie; "Development of Oxygen Transport Membranes for Coal-Based Power Generation"; ScienceDirect (Available online at www.sciencedirect.com); Energy Procedia 4 (2011) pp. 750-755.
(Continued)

*Primary Examiner* — Jason M Greene
(74) *Attorney, Agent, or Firm* — Ralph J. Mancini

(57) ABSTRACT

A carbon capture enabled system and method for generating electric power and/or fuel from methane containing sources using oxygen transport membranes by first converting the methane containing feed gas into a high pressure synthesis gas. Then, in one configuration the synthesis gas is combusted in oxy-combustion mode in oxygen transport membranes based boiler reactor operating at a pressure at least twice that of ambient pressure and the heat generated heats steam in thermally coupled steam generation tubes within the boiler reactor; the steam is expanded in steam turbine to generate power; and the carbon dioxide rich effluent leaving
(Continued)

the boiler reactor is processed to isolate carbon. In another configuration the synthesis gas is further treated in a gas conditioning system configured for carbon capture in a pre-combustion mode using water gas shift reactors and acid gas removal units to produce hydrogen or hydrogen-rich fuel gas that fuels an integrated gas turbine and steam turbine system to generate power. The disclosed method and system can also be adapted to integrate with coal gasification systems to produce power from both coal and methane containing sources with greater than 90% carbon isolation.

19 Claims, 4 Drawing Sheets

(51) Int. Cl.
H02K 7/18 (2006.01)
C10J 3/48 (2006.01)
F02C 7/22 (2006.01)
C10J 3/20 (2006.01)
F01D 15/10 (2006.01)
F02C 3/28 (2006.01)
C01B 3/38 (2006.01)
C01B 3/48 (2006.01)
C01B 13/02 (2006.01)
F01K 13/00 (2006.01)
F01K 23/06 (2006.01)

(52) U.S. Cl.
CPC ........... C01B 13/0251 (2013.01); F01D 15/10 (2013.01); F01K 13/00 (2013.01); F01K 23/068 (2013.01); F02C 3/28 (2013.01); F02C 7/22 (2013.01); H02K 7/1823 (2013.01); C01B 2203/0244 (2013.01); C01B 2203/0283 (2013.01); C01B 2203/0415 (2013.01); C01B 2203/06 (2013.01); C01B 2203/127 (2013.01); C01B 2203/1241 (2013.01); C01B 2203/84 (2013.01); C01B 2203/86 (2013.01); C10J 2300/093 (2013.01); C10J 2300/0959 (2013.01); C10J 2300/0976 (2013.01); C10J 2300/1678 (2013.01); Y02E 20/16 (2013.01); Y02E 20/18 (2013.01); Y02E 20/185 (2013.01); Y02P 20/129 (2015.11); Y02P 20/13 (2015.11); Y02P 30/30 (2015.11)

(58) Field of Classification Search
USPC .......................................................... 95/54
See application file for complete search history.

(56) References Cited

U.S. PATENT DOCUMENTS

| | | | |
|---|---|---|---|
| 3,282,803 A | 11/1966 | Poepel et al. |
| 3,317,298 A | 5/1967 | Klomp et al. |
| 3,468,647 A | 9/1969 | Buyers et al. |
| 3,770,621 A | 11/1973 | Collins et al. |
| 3,861,723 A | 1/1975 | Kunz et al. |
| 3,868,817 A | 3/1975 | Marion et al. |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Bonaquist et al. |
| 4,153,426 A | 5/1979 | Wintrell |
| 4,162,993 A | 7/1979 | Retalick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retalick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retalick |
| 4,609,383 A | 9/1986 | Bonaventura et al. |
| 4,631,238 A | 12/1986 | Ruka |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richards et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |
| 5,643,355 A | 7/1997 | Phillips et al. |
| 5,649,517 A | 7/1997 | Poola et al. |
| 5,707,911 A | 1/1998 | Rakhimov et al. |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A | 1/2000 | Keskar et al. |
| 6,035,662 A | 3/2000 | Howard et al. |
| 6,048,472 A | 4/2000 | Nataraj et al. |
| 6,051,125 A | 4/2000 | Pham et al. |
| 6,070,471 A | 6/2000 | Westphal et al. |
| 6,077,323 A | 6/2000 | Nataraj et al. |
| 6,110,979 A | 8/2000 | Nataraj et al. |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| RE37,134 E | 4/2001 | Wilson |
| 6,214,066 B1 | 4/2001 | Nataraj et al. |
| 6,290,757 B1 | 9/2001 | Lawless |
| 6,293,084 B1 | 9/2001 | Drnevich et al. |
| 6,293,978 B2 | 9/2001 | Kleefisch et al. |
| 6,296,686 B1 | 10/2001 | Prasad et al. |
| 6,333,015 B1 | 12/2001 | Lewis |
| 6,352,624 B1 | 3/2002 | Crome et al. |
| 6,360,524 B1 | 3/2002 | Drnevich et al. |
| 6,368,491 B1 | 4/2002 | Cao et al. |
| 6,382,958 B1 | 5/2002 | Bool, III et al. |
| 6,394,043 B1 | 5/2002 | Bool, III et al. |

(56) References Cited

U.S. PATENT DOCUMENTS

| | | |
|---|---|---|
| 6,402,156 B1 | 6/2002 | Schutz et al. |
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Repasky et al. |
| 8,435,332 B2 | 5/2013 | Christie et al. |
| 8,455,382 B2 | 6/2013 | Carolan et al. |
| 6,191,573 B1 | 11/2013 | Garing et al. |
| 8,658,328 B2 | 2/2014 | Suda et al. |
| 8,795,417 B2 | 8/2014 | Christie et al. |
| 8,894,944 B2 | 11/2014 | Larsen et al. |
| 2002/0073938 A1 | 6/2002 | Bool et al. |
| 2002/0078906 A1 | 6/2002 | Prasad et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0039466 A1 | 2/2007 | Nawata et al. |
| 2007/0041894 A1* | 2/2007 | Drnevich ............... C01B 3/382 423/650 |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0289215 A1 | 12/2007 | Hemmings et al. |
| 2007/0292342 A1 | 12/2007 | Hemmings et al. |
| 2007/0292742 A1 | 12/2007 | Ball et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1* | 6/2008 | Shah ................. C01B 13/0251 60/648 |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1* | 4/2009 | Wei .......................... C01B 3/48 48/73 |
| 2009/0107046 A1* | 4/2009 | Leininger ............... C10J 3/506 48/86 R |
| 2009/0120379 A1 | 5/2009 | Bozzuto et al. |
| 2009/0220837 A1 | 9/2009 | Osada |
| 2010/0015014 A1 | 1/2010 | Gopalan et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1* | 8/2011 | Ramkumar ............... C01B 3/48 423/656 |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2012/0288439 A1 | 11/2012 | Sundaram et al. |
| 2012/0294783 A1 | 11/2012 | Palamara et al. |
| 2013/0009100 A1 | 1/2013 | Kelly et al. |

(56) References Cited

U.S. PATENT DOCUMENTS

| | | | |
|---|---|---|---|
| 2013/0009102 A1* | 1/2013 | Kelly | C01B 3/384 252/373 |
| 2013/0015405 A1 | 1/2013 | Quintero | |
| 2013/0072374 A1 | 3/2013 | Lane et al. | |
| 2013/0072375 A1 | 3/2013 | Lane et al. | |
| 2013/0156958 A1 | 6/2013 | Belov et al. | |
| 2014/0044604 A1 | 2/2014 | Lane et al. | |
| 2014/0056774 A1 | 2/2014 | Kelly et al. | |
| 2014/0060643 A1 | 3/2014 | Martin et al. | |
| 2014/0183866 A1 | 7/2014 | Kromer et al. | |
| 2014/0206779 A1 | 7/2014 | Lackner | |
| 2014/0319424 A1 | 10/2014 | Chakravarti et al. | |
| 2014/0319427 A1 | 10/2014 | Chakravarti et al. | |
| 2014/0323597 A1 | 10/2014 | Stuckert et al. | |
| 2014/0323598 A1 | 10/2014 | Chakravarti et al. | |
| 2014/0323599 A1 | 10/2014 | Chakravarti et al. | |
| 2015/0098872 A1 | 4/2015 | Kelly et al. | |

FOREIGN PATENT DOCUMENTS

| | | |
|---|---|---|
| EP | 0 926 096 A1 | 6/1999 |
| EP | 0 984 500 A2 | 3/2000 |
| EP | 0 989 093 A2 | 3/2000 |
| EP | 1 504 811 A1 | 2/2005 |
| EP | 1717420 A1 | 11/2006 |
| EP | 1743694 A1 | 1/2007 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1 312 70 | 4/1973 |
| GB | 1348375 | 3/1974 |
| JP | 56-136605 | 10/1981 |
| WO | WO 9842636 | 10/1998 |
| WO | WO 0017418 | 3/2000 |
| WO | WO 0109059 A1 | 2/2001 |
| WO | WO 2007060141 | 5/2007 |
| WO | WO 2007086949 | 8/2007 |
| WO | WO 2008024405 | 2/2008 |
| WO | WO 2010052641 A2 | 5/2010 |
| WO | WO 2011083333 A1 | 7/2011 |
| WO | WO 2011121095 A2 | 10/2011 |
| WO | WO 2012118730 | 9/2012 |
| WO | WO 2013009560 A1 | 1/2013 |
| WO | WO 2013/062413 A1 | 5/2013 |
| WO | WO 2013089895 A1 | 6/2013 |
| WO | WO 2014074559 A1 | 5/2014 |
| WO | WO 2014077531 A1 | 5/2014 |
| WO | WO 2014/107707 A2 | 7/2014 |
| WO | WO 2014/176022 A1 | 10/2014 |

OTHER PUBLICATIONS

Friedemann Marschner et al., "Gas Production", Ullmann's Encyclopedia of Industrial Chemistry, Jun. 15, 2000, pp. 1-21, XP002253967.

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005, Published by Elsevier Ltd., Chapter 32, pp. 561-579.

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; Development of Interconnect Materials for Solid Oxide Fuel Cells; Materials Science and Engineering A348, Apr. 23, 2002, pp. 227-243.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with CO2 Recovery", Final Report (Feb. 2002).

The U.S. Department of Energy—Office of Fossil Energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC, pp. 1-10.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768, ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Tri Design for a CO2 Recovery Power Plant by Burning Pulverized Coal in O2/CO2, Energy Convers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

\* cited by examiner

OXYGEN TRANSPORT MEMBRANE REACTOR BASED METHOD AND SYSTEM FOR GENERATING ELECTRIC POWER

CROSS REFERENCE TO RELATED APPLICATIONS

This application claims priority to and the benefit of U.S. provisional patent application Ser. Nos. 61/939,029 filed on Feb. 12, 2014 and 61/980,149 filed on Apr. 16, 2014, the disclosures of which are incorporated by reference herein.

U.S. GOVERNMENT RIGHTS

This invention was made with Government support under Cooperative Agreement No. DE-FC26-07NT43088, awarded by the United States Department of Energy. The Government has certain rights in this invention.

FIELD OF THE INVENTION

The present invention provides a method and system for producing a product or co-products from synthesis gas mixture, and more particularly for producing a fuel/liquid product and/or electric power from a synthesis gas mixture comprising a coal-derived synthesis gas and/or synthesis gas produced from an oxygen transport membrane based reforming reactor.

BACKGROUND

There is continuing interest in reducing the release of carbon dioxide to atmosphere from facilities producing power, heat, fuel and/or chemicals using coal, biomass, petroleum coke, heavy oil, asphalt, natural gas, land fill gas, and other carbonaceous materials. In coal-fired power plants, coal is combusted to generate heat within a boiler to raise steam. The steam is passed into a steam turbine to generate electrical power. In these plants carbon capture is generally implemented as a solvent or sorbent based flue-gas post capture system. Flue gas post capture systems have a large impact on the power plant's overall efficiency due to the energy required in the post capture system for regeneration of the capture media. These systems can also be large and capital intensive due to the very large volume of nitrogen and oxygen contained in the flue gas, and the relatively small concentration of CO2 in the stream (4 to 15% by volume).

The use of oxygen transport membrane (OTM) systems have been contemplated in connection with carbon capture enabled boiler systems to carry out oxy-combustion and produce a flue gas concentrated in CO2. Examples of such systems that can be used to generate electricity are such as those disclosed in U.S. Pat. Nos. 6,394,043; 6,382,958; 6,562,104; and, more particularly U.S. Pat. Nos. 7,856,829 and 8,196,387 and United States patent publication number US 2014/0183866. In such OTM based systems, oxygen is separated from the air with the use of a ceramic membrane that is capable of oxygen ion transport at elevated temperatures. The oxygen ionizes on one surface of the membrane by gaining electrons to form the oxygen ions. Under a driving force of a partial pressure differential, the oxygen ions pass through the membrane and either react with a fuel or recombine to elemental oxygen liberating the electrons used in the ionization of the oxygen.

The advanced power cycle systems disclosed in U.S. Pat. Nos. 7,856,829 and 8,196,387 combust syngas such as that produced in coal gasification systems in oxygen transport membrane reactors configured as oxygen transport membrane boiler. These advanced power cycle systems utilize oxygen transport membrane based partial oxidation (POx) stages operating in a high pressure environment of about 350 psig to directly heat the syngas from the gasifier ahead of the oxygen transport membrane based boiler. One of the recognized problems associated with oxygen transport membranes is that when operating in severe environments that result when combusting fuel at high pressure such as that in oxygen transport membrane based boiler, the reliability of the oxygen transport membranes typically suffer, resulting in more membrane failures and associated system operating downtime and maintenance costs. In addition, oxygen transport membranes that are designed to operate in higher pressure environments typically require very thick support layers thus significantly increasing the cost of the oxygen transport membranes and associated reactors. Therefore, in lieu of operating the oxygen transport membrane boilers at high pressures, these advanced power cycle systems contemplate expanding the heated high pressure gasifier stream to pressure levels as low as near ambient before introduction into the oxygen transport membrane boiler. Regulating or reducing the high pressure gasifier stream involves specialized equipment and adversely impacts the overall economics and efficiency of the oxygen transport membrane based power system. Also, at low pressure the oxygen flux across the membranes is lower, requiring more membrane area, hence higher capital cost.

The electrical power generation method and system described in United States patent publication number US 2014/0183866 first produces a high pressure coal-derived synthesis gas stream by gasifying coal in a gasifier using oxygen from a cryogenic air separation plant; the coal-derived syngas is indirectly heated with radiant heat generated in a partial oxidation oxygen transport membrane reactor stream and expanded to a low pressure that is sufficiently above the atmospheric pressure to overcome the pressure drops in downstream steps. A slip stream of this low pressure syngas is reacted with permeated oxygen in the partial oxygen transport membrane reactor to provide the radiant heat for indirect heating of coal-derived syngas. The reaction products from the partial oxidation oxygen transport membrane reactor and the remaining portion of the low pressure syngas are introduced in an oxygen transport membrane boiler system where these react with permeated oxygen and a source of supplemental oxygen to form carbon dioxide containing flue gas stream while producing steam from a source of boiler feed water. Electric power is generated by expanding the steam in a steam turbine subsystem operatively associated with the oxygen transport membrane based boiler. The carbon dioxide containing flue gas stream is processed to produce a carbon dioxide-rich stream. This oxygen transport membrane based power cycle system facilitates operation of the oxygen transport membrane at low fuel pressures with high fuel utilization or fuel conversion of the high pressure coal-derived synthesis gas and capturing carbon dioxide from oxy-combustion flue gas.

An alternate to boiler based steam cycle power plant is an integrated gasification and combined cycle (IGCC) power generation system in which coal is first converted into a syngas that fuels a gas turbine. In a typical gasifier the carbonaceous feed is reacted with steam and oxygen to produce the syngas. Typically, the oxygen is provided to the gasifier by a cryogenic air separation unit. These IGCC systems can be configured for partial or complete carbon capture.

The IGCC systems configured for full or at least greater than 90% of the carbon capture utilize water gas shift reactors and acid gas removal system to fuel the gas turbine with a hydrogen-rich fuel. For example, in coal-based pre-combustion carbon capture enabled IGCC systems, the syngas produced as a result of the gasification is cooled and further processed in one or more water-gas shift reactors to react carbon monoxide with steam to increase the hydrogen and carbon dioxide content of the syngas. The water-gas shift reactor also hydrolyzes most of the carbonyl sulfide into hydrogen sulfide. The syngas is then further cooled for carbon dioxide and hydrogen sulfide separation within a known solvent scrubbing plant employing physical or chemical absorption for separation of the carbon dioxide and hydrogen sulfides and carbonyl sulfide from the syngas. This allows for the capture and sequestration of the carbon dioxide which is present within the syngas. The resulting hydrogen-rich gas is then fed to a gas turbine that is coupled to an electrical generator to generate electricity. Heat is recovered from the cooling of the raw syngas stream, from cooling the heated discharge from the water-gas shift reactor, and cooling the exhaust from the gas turbine to raise steam. The steam is expanded in a steam turbine to generate additional electrical power.

Systems that employ oxygen blown coal gasification to create a syngas and utilize a water-gas shift and acid-gas separation approach have improved efficiency over the post-capture cases, but are challenged with the capital costs of both oxygen plant, coal gasifier trains, and subsequent clean-up, shift, and separation equipment. Unconverted hydrocarbons, predominantly methane, contained in the syngas from the gasifier is not converted downstream, nor captured by the acid-gas recovery system, and results in a loss of carbon capture efficiency (higher carbon emissions to the atmosphere).

As can be appreciated, the IGCC is environmentally very advantageous in that a clean burning synthesis gas stream is used to power the gas turbine while at the same time, the carbon dioxide produced by the gasification can be captured for use in other industrial processes, for enhanced oil recovery or for sequestration.

There is also considerable interest in utilizing hydrocarbon containing sources with carbon capture. The natural gas, landfill gas, biogas, coke oven gas, process streams available in chemical plants, petroleum refineries, metallurgical plants and the like are some examples of such hydrocarbon containing sources. These sources when used directly in a boiler or gas turbine are amenable to post combustion carbon capture. Another option is to convert these by either reforming or oxidation reactions into a syngas that is further treated in water gas shift reactor and acid gas removal system to produce a hydrogen-rich fuel. This way the carbon dioxide is captured upstream of the boiler or gas turbine.

Steam methane reformers (SMR), oxygen-blown reformers (ATR), partial oxidation reactors (POx) are known to convert methane containing sources into syngas. These, either require fuel-fired furnaces to provide heat for the endothermic reactions, or air separation units (ASU) to supply oxygen. The energy required for these technologies and the additional non-captured carbon resulting from the fuel-fired heaters and furnaces result in energy and carbon capture efficiency penalties.

The present invention proposes the deployment of oxygen transport membranes based oxygen transport membrane syngas reactor at the front end of a carbon-capture enabled system to first convert the feedstock into a synthesis gas that as needed can be further processed in one or more water gas shift reactors and an acid gas removal system to produce a fuel or fuel the integrated gas turbine or oxy-combustion boiler power generation system. U.S. Pat. Nos. 6,048,472; 6,110,979; 6,114,400; 6,296,686; 7,261,751; and 8,349,214 disclose different oxygen transport membrane syngas reactor configurations that convert methane into synthesis gas by reactions with oxygen supplied from low pressure air across the membrane, and in the presence of reforming catalysts. This technology avoids the need for additional air separation unit plant oxygen to react the methane, and requires a lower amount of fuel-fired heat to support the reforming reactions. The product synthesis gas from the oxygen transport membrane syngas reactor has typically greater than 90% of the methane in the feed reacted to form a synthesis gas comprising hydrogen and CO. This synthesis gas, with reduced methane, can then be utilized downstream in either a combined cycle utilizing gas and steam turbines or full oxy-combustion power generation cycle while facilitating carbon capture. In the case of the combined cycle configuration, a slip stream of the separated hydrogen post acid gas removal may be used for providing the heat to carry out endothermic reforming reactions in oxygen transport membrane syngas system thus avoiding additional CO2 emissions.

SUMMARY OF THE INVENTION

The present invention in one or more aspects can be characterized as a carbon capture enabled oxygen transport membrane based power generation system comprising: (i) an oxygen transport membrane based combined reforming subsystem configured to produce a hydrogen-rich, high pressure synthesis gas stream from a hydrocarbon containing feed stream and steam; (ii) an oxygen transport membrane based power cycle subsystem comprising an oxygen transport membrane based boiler reactor configured to produce steam, electric power, and a carbon dioxide containing effluent by combusting at least a portion of the hydrogen-rich, high pressure synthesis gas stream at a pressure at least three times that of ambient pressure in the oxygen transport membrane based boiler reactor; and (iii) an optional CO2 purification unit to produce a CO2-rich product. The oxygen transport membrane based boiler reactor is preferably configured to combust the first synthesis gas to form an effluent having a heating value less than 100 Btu/scf and containing less than about 10% hydrogen.

The present invention in one or more aspects can also be characterized as a carbon capture enabled oxygen transport membrane based power generation system comprising: (i) an oxygen transport membrane based combined reforming subsystem configured to produce a hydrogen-rich, high pressure synthesis gas stream from a hydrocarbon containing feed stream and steam; (ii) an integrated gas turbine and steam turbine based power cycle subsystem comprising a gas turbine fueled by the hydrogen-rich, high pressure synthesis gas stream to produce steam, electric power, and a carbon dioxide containing effluent by combusting the hydrogen-rich, high pressure synthesis gas stream; and (iii) an optional CO2 purification unit to produce a CO2 rich product.

Still another characterization of the present invention is an oxygen transport membrane based power generation system comprising an oxygen transport membrane based power generation system comprising: (i) an oxygen transport membrane based reforming subsystem configured to produce a hydrogen-rich, high pressure synthesis gas stream from a hydrocarbon containing feed stream and steam; and (ii) an oxygen transport membrane based power cycle subsystem comprising an oxygen transport membrane based boiler reactor configured to produce steam, electric power, and a carbon dioxide containing effluent by combusting at least a portion of the hydrogen-rich, high pressure synthesis gas stream at a pressure at least three times that of ambient pressure in the oxygen transport membrane based boiler reactor. The oxygen transport membrane based boiler reactor is preferably configured to combust the first synthesis gas to form an effluent having a heating value less than 100 Btu/scf and containing less than about 10% hydrogen.

Yet still another characterization of the present invention is an oxygen transport membrane based power generation system comprising an oxygen transport membrane based power generation system comprising: (i) an oxygen transport membrane based reforming subsystem configured to produce a hydrogen-rich, high pressure synthesis gas stream from a hydrocarbon containing feed stream and steam; and (ii) an integrated gas turbine and steam turbine power cycle subsystem comprising a gas turbine fueled by the hydrogen-rich, high pressure synthesis gas produced in the oxygen transport membrane based reforming subsystem to generate steam, electric power, and a carbon dioxide containing effluent by combusting the hydrogen-rich, high pressure synthesis gas stream.

The present invention in one or more aspects can also be characterized as an oxygen transport membrane based co-product system comprising: (i) a coal gasification subsystem configured to produce a coal-derived, high pressure synthesis gas stream from a source of coal, steam and oxygen produced from cryogenic distillation of air; (ii) an oxygen transport membrane based reforming subsystem configured to produce a hydrogen-rich, high pressure synthesis gas stream from a hydrocarbon containing feed stream and steam; (iii) an oxygen transport membrane based power cycle subsystem comprising an oxygen transport membrane based boiler reactor configured to produce steam, electric power, and a carbon dioxide containing effluent by combusting a first synthesis gas feed stream at a pressure at least twice, in another embodiment at least 2.5 times, and in still another embodiment at least three times that of ambient pressure in the oxygen transport membrane based boiler reactor; and (iv) a fuel product or liquid product synthesis subsystem configured to produce a fuel product or liquid product from a second synthesis gas feed stream. A portion of the coal-derived, high pressure synthesis gas stream or a portion of the hydrogen-rich high pressure synthesis gas stream or a combination of portions of both high pressure synthesis gas streams form the first synthesis gas feed stream. In addition, a portion of the coal-derived, high pressure synthesis gas stream or a portion of the hydrogen-rich, high pressure synthesis gas stream or a combination of both high pressure synthesis gas streams form the second synthesis gas feed stream. The oxygen transport membrane based boiler reactor is preferably configured to combust the first synthesis gas to form an effluent having a heating value less than 100 Btu/scf and containing less than about 10% hydrogen.

Alternatively, the present invention may be characterized as an oxygen transport membrane based hybrid system comprising: (i) a coal gasification subsystem configured to produce a coal-derived, high pressure synthesis gas stream from a source of coal, steam and oxygen produced from cryogenic distillation of air; (ii) an oxygen transport membrane based reforming subsystem configured to produce a hydrogen-rich, high pressure synthesis gas stream from a hydrocarbon containing feed stream and steam; and (iii) a fuel product or liquid product synthesis subsystem configured to produce a fuel product or liquid product from a second synthesis gas feed stream. A portion of the coal-derived, high pressure synthesis gas stream or a portion of the hydrogen-rich, high pressure synthesis gas stream or a combination of portions of both high pressure synthesis gas streams form the second synthesis gas feed stream. In some preferred embodiments, the oxygen transport membrane based reforming system is also configured to provide at least three times the oxygen atoms in the hydrogen-rich high pressure synthesis gas stream than the oxygen atoms provided to the coal-derived high pressure synthesis gas by the oxygen produced from cryogenic distillation of air.

The present invention may also be characterized as an oxygen transport membrane based power generation system comprising: (i) a coal gasification subsystem configured to produce a coal-derived, high pressure synthesis gas stream from a source of coal, steam and oxygen produced from cryogenic distillation of air; (ii) an oxygen transport membrane based reforming subsystem configured to produce a hydrogen-rich, high pressure synthesis gas stream from a hydrocarbon containing feed stream and steam; and (iii) an oxygen transport membrane based power cycle subsystem comprising an oxygen transport membrane based boiler reactor configured to produce steam, electric power, and a carbon dioxide containing effluent by combusting a first synthesis gas feed stream at a pressure at least twice, in another embodiment at least 2.5 times, and in yet another embodiment at least three times that of ambient pressure in the oxygen transport membrane based boiler reactor; wherein a portion of the coal-derived, high pressure synthesis gas stream or a portion of the hydrogen-rich high pressure synthesis gas stream or a combination of portions of both high pressure synthesis gas streams form the first synthesis gas feed stream. The oxygen transport membrane based boiler reactor is preferably configured to combust the first synthesis gas to form an effluent having a heating value less than 100 Btu/scf and containing less than about 10% hydrogen.

The present system may also be characterized as an oxygen transport membrane based power generation system comprising: an oxygen transport membrane based power generation system comprising: (i) a coal gasification subsystem configured to produce a coal-derived, high pressure synthesis gas stream from a source of coal, steam and oxygen produced from cryogenic distillation of air; and (ii) an oxygen transport membrane based power cycle subsystem comprising an oxygen transport membrane based boiler reactor configured to produce steam, electric power, and a carbon dioxide containing effluent by combusting the coal-derived synthesis gas feed stream at a pressure at least twice, in another embodiment at least 2.5 times, and in yet another embodiment at least three times that of ambient pressure in the oxygen transport membrane based boiler reactor. The oxygen transport membrane based boiler reactor is preferably configured to combust the first synthesis gas to form an effluent having a heating value less than 100 Btu/scf and containing less than about 10% hydrogen.

Lastly, the present invention may be characterized a method of producing-natural gas and coal derived co-products comprising: (a) gasifying coal with steam and oxygen in a coal gasification reactor to produce a coal-derived, high pressure synthesis gas stream; (b) reforming a hydrocarbon feed stream and steam in the presence of a reforming catalyst and heat produced from oxygen transport membrane reforming reactor to produce a hydrogen-rich, high pressure synthesis gas stream; (c) directing a portion of the coal-derived, high pressure synthesis gas stream or a portion of the hydrogen-rich, high pressure synthesis gas stream or a combination of portions of both high pressure synthesis gas streams to an oxygen transport membrane based power cycle subsystem comprising an oxygen transport membrane boiler reactor configured to combust the hydrogen-rich, high pressure synthesis gas stream at a pressure at least twice, in another embodiment at least 2.5 times, and in yet another embodiment at least three times that of the ambient pressure, and said subsystem configured to produce steam, electric power, and a carbon dioxide containing effluent; and (d) directing a portion of the coal-derived high pressure synthesis gas stream or a portion of the hydrogen-rich, high pressure synthesis gas stream or a combination of both high pressure synthesis gas streams to a fuel product or liquid product synthesis subsystem configured to produce a fuel product or liquid product. In this method, the oxygen transport membrane based boiler reactor is preferably configured to combust the first synthesis gas to form an effluent having a heating value less than 100 Btu/scf and containing less than about 10% hydrogen.

BRIEF DESCRIPTION OF THE DRAWINGS

The above and other aspects, features, and advantages of the present invention will be more apparent from the following, more detailed description thereof, presented in conjunction with the following drawings, in which.

DETAILED DESCRIPTION

Oxygen Transport Membrane Based Steam Bottoming Cycle

Figure 1:
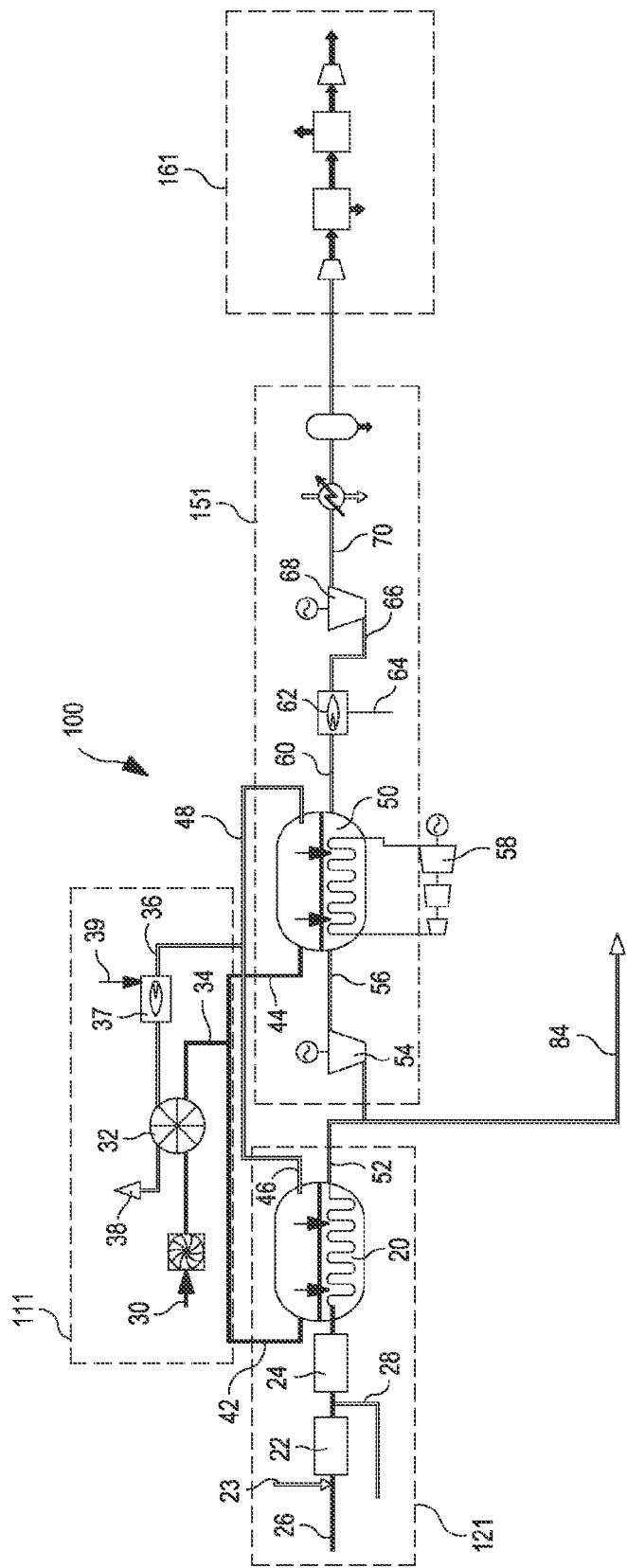
FIG. 1 shows a schematic illustration of a method and system containing an oxygen transport membrane based reforming reactor and oxygen transport membrane based boiler to produce electric power.

In a broad sense, FIG. 1 is a block diagram illustrating a carbon capture enabled oxygen transport membrane based steam bottoming cycle system 100 for producing electric power. The system 100 comprises an air supply and pre-heating subsystem 111; an oxygen transport membrane based synthesis gas subsystem 121; a power generation subsystem 151 comprising an oxygen transport membrane based boiler and a steam turbine; and a carbon dioxide purification unit or subsystem 161.

Air Preheat Subsystem

With reference to FIG. 1, the air supply and preheating subsystem 111 includes a source of feed air or other oxygen containing feed stream 30; a continuously rotating regenerative air preheater 32 configured to heat the source of feed air; and conduits for supplying the heated feed air stream 34 from the regenerative air preheater to the oxygen transport membrane based synthesis gas subsystem 121, and oxygen transport membrane based power generation subsystem 151. The air supply and preheat subsystem further includes a plurality of return conduits configured to return the heated, oxygen depleted air stream 36 from the oxygen transport membrane based power generation and oxygen transport membrane based synthesis gas subsystems to the regenerative air preheater to heat the source of feed air or other oxygen containing feed stream 30 and subsequently exhaust the cooled oxygen depleted stream 38.

The heated and oxygen depleted stream 36 can optionally be introduced into a duct burner region within the return conduits which include one or more duct burners 37 used to support combustion of a supplemental fuel stream 39 to produce supplemental heat introduced into the continuously rotating regenerative air preheater and preheat the feed air stream. Alternatively, the duct burner may also be disposed directly in the air intake duct downstream of the heat exchanger to pre-heat the incoming feed air stream. The supplemental fuel stream can be natural gas or a process/tail gas routed from elsewhere in the plant or a combination thereof.

A portion of the heated feed air stream 34 from the regenerative air preheater is routed to the oxygen transport membrane based reforming reactor 20 as stream 42 while another portion of the heated feed air stream 34 from the regenerative air preheater is routed to the oxygen transport membrane based boiler 50 as stream 44. Similarly, the residual heated, oxygen-depleted stream 46 that exits the oxygen transport membrane based reforming reactor 20 is combined with the residual heated, oxygen-depleted stream 48 that exits the oxygen transport membrane based boiler 50 to form the residual heated, oxygen depleted stream 36 and used to preheat the incoming feed air stream 30, via the ceramic regenerative air preheater 32, discussed above.

The heated feed air stream 42 is directed to the oxidant-side of the oxygen transport membrane based reforming reactor 20, and more particularly to the oxidant-side of the oxygen transport membrane elements or tubes within the oxygen transport membrane based reforming reactor 20. As the heated feed air stream 42 flows across the oxidant-side surfaces of the oxygen transport membrane elements or tubes, oxygen ions from the heated feed air stream permeate through the oxygen transport membrane elements or tubes to the reactant side of the oxygen transport membrane elements or tubes. The oxygen ions recombine at the permeate side of the oxygen transport membrane elements or tubes and react with a hydrogen containing stream at the permeate side to create the heat and a difference in oxygen partial pressure across the oxygen transport membrane element which drives the oxygen transport.

As a result of the reactively driven oxygen ion transport across the membranes in oxygen transport membrane based reforming reactor 20, the heated feed air stream 42 becomes generally depleted of oxygen and heated by the convective heat transfer between the oxygen transport membrane elements or tubes and the passing air stream. At the high temperatures within the oxygen transport membrane based reforming reactor 20, approximately 70% or more of the oxygen within the feed air stream is transported or permeated across the oxygen transport membrane elements or tubes. The residual stream is thus a heated, oxygen-depleted stream 46 that exits the oxygen transport membrane based reforming reactor and is used to preheat the incoming feed air stream, via a ceramic regenerative air preheater.

The heated feed air stream 44 is directed to the oxidant-side of the oxygen transport membrane based boiler 50, and more particularly to the oxidant-side of the oxygen transport membrane elements or tubes within the oxygen transport membrane based boiler 50. As the heated feed air stream 44 flows across the oxidant-side surfaces of the oxygen transport membrane elements or tubes, oxygen ions from the heated feed air stream permeate through the oxygen transport membrane elements or tubes to the reactant side of the oxygen transport membrane elements or tubes. The oxygen ions recombine at the permeate side of the oxygen transport membrane elements or tubes and react with a synthesis gas stream 52 at the permeate side to create the heat and a difference in oxygen partial pressure across the oxygen transport membrane element which drives the oxygen transport.

As a result of the reactively driven oxygen ion transport across the membranes in oxygen transport membrane based boiler 50, the heated feed air stream 44 becomes generally depleted of oxygen and heated by the convective heat transfer between the oxygen transport membrane elements or tubes and the passing air stream. At the high temperatures within the oxygen transport membrane based boiler 50, approximately 70% or more of the oxygen within the feed air stream is transported or permeated across the oxygen transport membrane elements or tubes. The residual stream is thus a heated, oxygen-depleted stream 48 that exits the oxygen transport membrane based boiler reactor and is used to preheat the incoming feed air stream 30, via the ceramic regenerative air preheater 32.

The illustrated air supply and preheat subsystem also includes a blower or fan required to convey an oxygen containing feed stream through the regenerative air preheater and the downstream oxygen transport membrane reactors.

Oxygen Transport Membrane Based Synthesis Gas Subsystem

The oxygen transport membrane based synthesis gas subsystem 121 in FIG. 1 is configured to convert methane containing feed stream into synthesis gas suitable for use in the oxygen transport membrane based boiler subsystem 50 to generate electricity. The subsystem 121 comprises a feed conditioning subsystem; oxygen transport membrane based reforming reactor; and optionally a heat recovery section.

The feed conditioning subsystem comprises a purification unit 22 and an optional pre-reforming unit 24. Typically the purification unit 22 employs a known catalytic hydro-desulfurization (HDS) process to desulfurize methane containing feed such as natural gas. A small amount of hydrogen or hydrogen-rich gas is provided to the HDS reactor to react with sulfur species present in the natural gas at a temperature in the range of from about 300° C. to 400° C. The sulfur species are reduced to $H_2S$, which is subsequently removed in a guard bed using material like ZnO and/or CuO.

The purified feed and a steam stream 28 are then routed either directly or through a pre-reformer (PRef) unit 24 to the oxygen transport membrane based reforming reactor 20. The pre-reformer is optional and utilized when higher hydrocarbons are present in the feed stream. The higher hydrocarbons break down at high temperatures to form unwanted carbon deposits that adversely impact the reforming process, hence the pre-reformer is utilized to convert the higher hydrocarbons into methane, hydrogen, carbon monoxide, and carbon dioxide. The pre-reformer can be configured as an adiabatic pre-reformer or a heated pre-reformer that is thermally coupled with the oxygen transport membrane based reforming subsystem.

The steam is preferably superheated steam at a pressure of from about 15 bar to about 80 bar and a temperature of from about 300° C. to about 600° C. and may be generated in a fired heater using a source of process steam or diverted from other portions of the system including the oxygen transport membrane based boiler subsystem 151. The superheated steam is preferably added to the natural gas feed stream upstream of any pre-reformer to adjust the steam to carbon ratio and final temperature of the combined natural gas based feed stream. If required, the combined natural gas based feed stream may be further preheated to get the combined feed stream to the desired temperature. The temperature of the combined natural gas based feed stream directed to the oxygen transport membrane based reforming reactor or converter is preferably from about 300° C. to about 750° C., and in another embodiment from about 450° C. to about 600° C. The steam to carbon ratio of the combined natural gas based feed stream is preferably from about 1.0 to about 2.5, and in another embodiment from about 1.2 to about 2.2.

The oxygen transport membrane based reforming reactor 20 can be configured utilizing one or more reactor designs disclosed in the United States patent applications published as US2014/0319424; US2014/0323598; and US2014/0319427; the disclosures of which are incorporated by reference herein.

The reactor design disclosed in US2014/0319424 is preferred and from here on referred to as the OTM Combined Reforming Reactor I. This reactor design comprises two reactor sections. A first reforming reactor section preferably consists of a plurality of reforming tubes where the primary reforming occurs. A second reactor section, namely an oxygen transport membrane based reactor, consists of oxygen transport membrane tubes where secondary reforming of the partially reformed stream occurs. Although only six secondary reforming oxygen transport membrane tubes are illustrated in close proximity to three primary reforming tubes as would occur to those skilled in the art, there could be many of such secondary reforming oxygen transport membrane tubes and many primary reforming tubes in each subsystem. In alternative embodiments of the present invention a coal-derived synthesis gas containing methane is introduced in the secondary reforming oxygen transport membrane tubes in the second reactor section, either alone or in conjunction with reaction products from the first reforming reactor section.

The heated air feed stream is directed via an intake duct to a plurality of secondary reforming oxygen transport membrane tubes having an oxidant side and a reactive side that is capable of conducting oxygen ions at an elevated operational temperature. The oxidant side of the secondary reforming oxygen transport membrane tubes is preferably the exterior surface of the ceramic tubes exposed to the heated oxygen containing stream and the reactant side or permeate side is preferably the interior surface of the ceramic tubes. Within each of the secondary reforming oxygen transport membrane tubes are one or more catalysts that facilitate partial oxidation and reforming.

The heated mixed feed stream first passes through the reforming tubes, which contain conventional reforming catalyst which partially reforms the natural gas based feed stream. The temperature of the partially reformed hydrogen-rich synthesis gas leaving the primary reforming tubes is designed to be from about 650° C. to about 850° C. This partially reformed synthesis gas is then fed to the oxygen transport membrane tubes that are also filled with a reforming catalyst. Oxygen from the heated intake or feed air permeates through the oxygen transport membrane tubes and facilitates a reaction between the permeated oxygen and a portion of the partially reformed synthesis gas at the reactant side of the tubes. A portion of the energy or heat generated by this reaction is used for in-situ secondary reforming of the residual methane in the partially reformed synthesis gas. The rest of the energy or heat is transferred by radiation to the reforming tubes to drive the primary reforming reactions and by convection to the oxygen-depleted retentate stream. The synthesis gas leaving the oxygen transport membrane tubes is at a temperature of from about 900° C. to about 1050° C. In other words, the endothermic heating requirements of the reforming process occurring in the primary reforming tubes is supplied through radiation of some of the heat from the secondary reforming oxygen transport membrane tubes together with the convective heat transfer provided by heated retentate stream.

As described in more detail in US2014/0319424; the produced synthesis gas stream produced by the OTM Combined Reforming Reactor I generally contains hydrogen, carbon monoxide, unconverted methane, steam, carbon dioxide and other constituents. A significant portion of the sensible heat from the produced synthesis gas stream can be recovered using a heat exchange section or recovery train that is designed to cool the produced synthesis gas stream while preheating the natural gas based feed stream and boiler feed water as well as generating process steam. The resulting cooled oxygen transport membrane derived synthesis gas generally has a module of from about 1.7 and 1.95 and a $H_2/CO$ ratio of from about 2.5 and 4.0. This cooled oxygen transport membrane derived synthesis gas is suitable for use as a feed stream to the oxygen transport membrane based power subsystem and/or as feed to make other products such as liquid fuels, hydrogen.

US2014/0323598 discloses an alternate reactor design employable in the present invention. This design, which will, from here on be referred to as the OTM Combined Reforming Reactor II, comprises three reactor sections disposed in a reactor housing. The first reactor section is a reforming reactor which comprises catalyst containing reforming tubes configured to reform the heated mixed feed stream in the presence of a conventional reforming catalyst disposed in the reforming tubes and heat to produce a reformed synthesis gas stream. The temperature of the reformed hydrogen-rich synthesis gas stream is designed to be from about 650° C. to about 850° C.

The reformed synthesis gas stream is then fed as an influent to the second reactor section which is an oxygen transport membrane based reforming reactor. More particularly, reformed synthesis gas stream is fed to a reactant side of a reactively driven and catalyst containing oxygen transport membrane based reactor. The reactively driven, oxygen transport membrane based reforming reactor includes one or more oxygen transport membrane elements or tubes each having an oxidant side and a reactant side that are disposed proximate to the reforming tubes. Each of the oxygen transport membrane elements or tubes are configured to separate oxygen from the heated feed air stream contacting the oxidant side and transport the separated oxygen to the reactant side through oxygen ion transport. The oxygen ion transport occurs when the oxygen transport membrane elements or tubes are subjected to elevated operational temperatures and there is a difference in oxygen partial pressure across the oxygen transport membrane elements or tubes.

As with the earlier described embodiments, a portion of the reformed synthesis gas stream fed to the reactant side of the oxygen transport membrane elements or tubes immediately reacts with the oxygen permeated to produce the difference in oxygen partial pressure across the oxygen transport membrane elements or tubes which drives the oxygen ion transport and separation. This reaction produces reaction products and more importantly, heat. A first portion of the generated heat is transferred via convection to the oxygen depleted retentate stream and a second portion of the heat is transferred via radiation to the catalyst containing reforming tubes. The oxygen transport membrane based reactor is also optionally configured to further reform any hydrocarbon gas in the reformed synthesis gas stream and produce a synthesis gas product stream. This secondary or combined reforming occurs in the presence of one or more reforming catalysts contained within the oxygen transport membrane elements or tubes, reaction products (e.g. from the reaction of a portion of the reformed synthesis gas stream and oxygen permeate) and a third portion of the energy or heat produced by the same reaction. The synthesis gas product stream leaving the oxygen transport membrane based reactor is preferably at a temperature of from about 900° C. to about 1050° C.

The third reactor section in the illustrated embodiment is an auxiliary oxygen transport membrane reactor that is configured to provide an auxiliary source of radiant heat to the reforming tubes. This auxiliary reactor or heat source preferably provides from about 15% and 85% of the heat required for the initial reforming of the heated mixed feed stream that occurs in the reforming tubes. The auxiliary oxygen transport membrane reactor is also a reactively driven oxygen transport membrane reactor that comprises a plurality of oxygen transport membrane elements or tubes disposed proximate to or in a juxtaposed orientation with respect to the reforming tubes. The auxiliary oxygen transport membrane reactor is configured to also separate or permeate oxygen from the air feed stream contacting the oxidant side of the oxygen transport membrane elements or tubes to the reactant side of the oxygen transport membrane elements or tubes through oxygen ion transport. The permeated oxygen reacts with a low pressure hydrogen containing stream, preferably less than about 3 bar, that is fed to the reactant side of the auxiliary oxygen transport membrane elements or tubes to produce the difference in oxygen partial pressure across the oxygen transport membrane element and to produce an auxiliary heat. In the illustrated embodiment, the low pressure hydrogen containing stream is a hydrogen and light hydrocarbon containing stream that preferably comprises a portion or all of the tail gas generated in the product synthesis subsystem or hydrogen production subsystem and optionally a supplementary fuel. The hydrogen and light hydrocarbon containing stream could alternatively include a recirculated portion of the synthesis gas product stream and optionally a supplementary fuel.

Preferably, the reforming reactor and the oxygen transport membrane based reactor are arranged as sets of closely packed tubes in close proximity to one another. The reforming reactor generally consists of reforming tubes whereas the oxygen transport membrane based reactor as well as the auxiliary oxygen transport membrane reactor comprise a plurality of ceramic oxygen transport membrane tubes. The oxygen transport membrane tubes are preferably configured as multilayered ceramic tubes capable of conducting oxygen ions at an elevated operational temperature, wherein the oxidant side of the oxygen transport membrane tubes is the exterior surface of the ceramic tubes exposed to the heated air feed stream and the reactant side or permeate side is the interior surface of the ceramic tubes. Within each of the oxygen transport membrane tubes are one or more catalysts that facilitate partial oxidation and/or reforming, as applicable. Although only three of the reforming tubes are illustrated in US2014/0323598 in close proximity to six of the secondary reforming oxygen transport membrane elements or tubes and four of the auxiliary oxygen transport membrane elements or tubes, there could be many of such oxygen transport membrane tubes and many reforming tubes in each oxygen transport membrane based reforming subsystem or assembly as would occur to those skilled in the art. Likewise, there could be multiple oxygen transport membrane based reforming assemblies used in industrial applications of the oxygen transport membrane based reforming system.

The synthesis gas stream produced by the OTM Combined Reforming Reactor II generally contains hydrogen, carbon monoxide, unconverted methane, steam, carbon dioxide and other constituents. A significant portion of the sensible heat from the produced synthesis gas stream can be recovered using a heat exchange section or recovery train that is designed to cool the produced synthesis gas stream while preheating the natural gas based feed stream and boiler feed water as well as generating process steam. The resulting cooled oxygen transport membrane derived synthesis gas generally has a module of from about 1.95 and 2.2 and a $H_2/CO$ ratio of from about 2.7 and 4.0. This cooled oxygen transport membrane derived synthesis gas is suitable for use as a feed stream to the oxygen transport membrane based power subsystem and/or as feed to make other products such as liquid fuels, hydrogen.

US2014/0319427 discloses yet another reactor design, which will be referred to herein as the OTM Recycle Reforming embodiment. This reactor design comprises a plurality of reforming tubes in close proximity to a plurality of heat producing oxygen transport membrane tubes disposed within the reactor housing. Each of the oxygen transport membrane tubes are preferably configured as a multilayered ceramic tube capable of conducting oxygen ions at an elevated operational temperature, wherein the oxidant side of the oxygen transport membrane elements is the exterior surface of the ceramic tubes exposed to the feed air stream and the reactant side is the interior surface of the tubes.

The heated intake or air feed stream is directed via the intake duct to the oxidant side of the oxygen transport membrane tubes where a portion of the oxygen permeates through the tubes to the reactant side. A hydrogen containing stream is also introduced into the reactant side of the oxygen transport membrane elements and is partially oxidized with the permeated oxygen to produce a reaction product stream and heat. The hydrogen containing stream fed to the reactant side of the oxygen transport membrane tubes is preferably a recycled portion of the synthesis gas produced by the reforming tubes. The reaction of the hydrogen containing stream or recycled synthesis gas stream at the reactant side of the oxygen transport membrane tubes lowers the partial pressure of oxygen at the reactant side of the tubes and thus drives the separation and transport of the oxygen. In addition, the partial oxidation reaction produces a significant amount of heat. Radiation of this heat together with the convective heat transfer provided by heated retentate stream heats the catalyst containing reforming tubes to supply the endothermic heating requirements of the steam methane reforming occurring in catalytic reactor tubes to produce synthesis gas.

The preferred synthesis gas recycle scheme involves recycling a portion of the heated synthesis gas stream exiting the catalyst containing reforming tubes and directing the hot recycled synthesis gas to the reactant side of the oxygen transport membrane tubes where it reacts with the permeated oxygen to generate the heated reaction product stream and radiant heat. The hot synthesis gas stream is driven or pulled to the reactant side of the oxygen transport membrane elements by means of an ejector, eductor or venturi based device operatively coupled between the exit manifold of the reformer tubes and the reactant side of the oxygen transport membrane tubes.

Oxygen Transport Membrane Based Power Subsystem

The illustrated oxygen transport membrane based power generation subsystem 151 shown in FIG. 1 provides an arrangement that supplies electric power from at least three separate sources including at least two expansion stages employing one or more turbo-expanders and a steam cycle stage operatively associated with an oxygen transport membrane based boiler reactor. The turbo-expanders are configured to expand the heated synthesis gas stream to generate electrical power. In the illustrated embodiments, the turbo-expanders are operatively coupled to one or more generators (not shown) configured to recover supplemental electrical power from the respective expansion stages.

The first source of electric power is generated in a first expansion stage where a source of high pressure synthesis gas is expanded using a first high pressure turbo-expander 54. This first turbo-expander is configured to generate a first source of electric power from the expansion of the high pressure synthesis gas stream by expanding the synthesis gas stream to an intermediate pressure that is at least more than two, in another embodiment at least 2.5, and in yet another embodiment at least three times the ambient pressure. In some embodiments of the present invention, the power generation subsystem 151 can be configured to throttle across a valve or appropriate pressure reduction device instead of using the turbo-expander 54 to provide the high pressure synthesis gas stream at the intermediate pressure. Alternately the power generation system 151 can be configured to contain one of several possible combinations of a throttling device and the turbo-expander 54.

The expanded synthesis gas stream is then directed to an oxygen transport membrane based boiler reactor 50. The oxygen transport membrane based boiler reactor 50 is configured to combust the expanded synthesis gas stream 56 at a pressure at least than two, in another embodiment at least 2.5, and in yet another embodiment at least three times that of the ambient pressure using permeated oxygen (shown as arrow) from the oxygen transport membrane elements; the permeated oxygen is separated from heated feed air stream 44 at a lower pressure than the expanded synthesis gas stream 56; the combustion reactions within the oxygen transport membrane boiler reactor 50 produce heat which is transferred radiantly to raise steam from boiler feed water passing through adjacent steam tubes within the oxygen transport membrane based boiler reactor. In the oxygen transport membrane based boiler reactor, steam tubes are also arranged proximate or juxtaposed to the oxygen transport membrane elements or tubes to facilitate the removal of energy needed to keep the surface temperatures of the oxygen transport membrane elements or tubes of from about 900° C. to about 1100° C., and in another embodiment about 1000° C. for optimal membrane performance and to raise supersaturated steam. The produced steam is directed to a steam turbine subsystem 58 that employs a steam cycle to generate the second source of electric power. The reaction products generated within the oxygen transport membrane based boiler reactor is directed as an effluent stream 60 to a downstream combustion section 62 to complete combustion of any unreacted or partially combusted species present. The downstream combustion section preferably contains an oxy-fuel burner to combust the residual synthesis gas exiting the oxygen transport membrane based boiler reactor with a source of supplemental oxygen supplied from a cryogenic air separation unit and produce a further heated carbon dioxide-rich effluent stream at about 1400° C. Such oxy-fuel combustion consumes most or all of the remaining synthesis gas while avoiding or mitigating problems associated with nitrogen entrainment in the carbon dioxide-rich effluent stream. Enough supplemental oxygen 64 from the cryogenic air separation unit or other source of oxygen say, for example, from an oxygen pipeline or a vacuum pressure swing adsorption (VPSA) unit, is supplied to the downstream combustion section of the power subsystem to preferably yield excess oxygen in the carbon dioxide-rich effluent stream 66. Alternatively, in applications where the carbon dioxide-rich effluent stream is used in enhanced oil recovery applications or other applications not sensitive to the nitrogen content in the stream, it is possible to replace the oxy-fuel combustor with an air-fired burner.

The resulting carbon dioxide-rich effluent stream 66 is directed to a second expansion stage 68 comprising a wet-gas turbo-expander configured to expand carbon dioxide-rich effluent stream with excess oxygen and supply the third source of electric power. The increased mass flow through the wet-gas turbo-expander due to the excess oxygen yields additional power output compared to conventional advanced power systems. Also, the pressure of the expanded carbon dioxide-rich effluent stream 70 exiting the wet gas turbo-expander is preferably maintained from about 5 psi to about 100 psi depending on the pressure required for any downstream applications of the carbon dioxide-rich effluent stream, such as carbon dioxide purification processes.

Following the second expansion stage, the expanded, carbon dioxide-rich effluent stream is optionally directed to a downstream heat recovery train that preferably comprises one or more economizers (not shown) and a boiler feed water preheater. Due to the high moisture level in the cooled flue gas some latent heat is transferable to the boiler feed water stream. Although not shown, some amount of energy may also be available from the gasifier subsystem or the oxygen transport membrane based reforming subsystem which optionally may be used to preheat the boiler feed water. The cooled, carbon dioxide-rich effluent stream is then introduced into a knock-out drum from which a condensate stream is drained.

The cooled and pre-treated carbon dioxide containing stream is then directed to an optional carbon dioxide purification subsystem 161. The carbon dioxide purification subsystem is configured to purify the cooled and pre-treated carbon dioxide containing effluent stream and produce a purified carbon dioxide-rich stream suitable for carbon dioxide capture and storage/sequestration (CCS) processing or direct use in processes such as enhanced oil recovery processing. In the illustrated embodiment, the carbon dioxide purification subsystem first compresses the carbon dioxide-rich effluent stream to roughly 375 psia in a multi-stage compression train. The compressed carbon-dioxide-rich stream is dried in a carbon dioxide dryer which is adapted to remove excess moisture and water through a temperature swing adsorption process thereby preventing or reducing corrosion of the gas handling components.

When a coal-derived syngas is also used to provide fuel to the oxygen transport membrane based boiler then the carbon dioxide purification subsystem is also configured to remove any undesirable impurities such as mercury and selected acids that may be present in the carbon dioxide-rich stream and may also include an auto-refrigerative process for inert removal. A typical auto-refrigerative process purifies the carbon dioxide stream to about 95% or greater purity with 97% recovery of carbon dioxide. This cryogenic based process also produces a vent stream which is enriched in atmospheric gases (e.g., $N_2$, $O_2$, and Ar). The purified carbon dioxide-rich effluent stream is then further compressed to about 2000 psia.

Oxygen Transport Membrane Based Reforming Reactors/Boiler

One of the key advantages of the present system and method is the modularization of the oxygen transport membrane based reactors used in the oxygen transport membrane based synthesis gas subsystem 121 as well as the oxygen transport membrane based boiler reactors used in the oxygen transport membrane based power subsystem 151. Details of the modular oxygen transport membrane based reactors are provided in U.S. provisional patent application Ser. Nos. 14/508,326; 14/509,381; and 14/509,406; the disclosures of which are incorporated by reference herein.

In the above-described embodiments of the oxygen transport membrane based synthesis gas subsystem 121, the oxygen transport membrane reforming reactor 20, also referred to as reactively driven oxygen transport membrane assembly or module can be constructed or comprised of: (i) a plurality of tubular ceramic oxygen transport membranes configured to transport oxygen ions from an oxygen containing stream present at the outside surface or oxidant side of the tubular ceramic oxygen transport membranes to the interior surface or reactant side of the tubular ceramic oxygen transport membranes; (ii) a plurality of catalyst containing reformer tubes disposed adjacent or juxtaposed relationship with the ceramic oxygen transport membrane tubes and configured to produce synthesis gas from the natural gas based mixed feed stream in the presence of a reforming catalyst and radiant heat generated from the tubular ceramic oxygen transport membranes; (iii) a first manifold with associated seals to allow for a flow of the natural gas based mixed feed stream and steam through the catalyst containing reformer tubes to produce a synthesis gas; (iv) a second manifold with associated seals to allow for the flow through the tubular ceramic oxygen transport membranes; and (v) an air staging system configured to supply air or other oxygen containing stream to the exterior surfaces of the plurality of tubular ceramic oxygen transport membranes. Some embodiments may optionally include a recycle circuit to provide a portion of the synthesis gas produced in the catalyst containing reformer tubes to the tubular ceramic oxygen transport membranes.

When multiple oxygen transport membrane assemblies or modules are arranged within an insulated duct with a heated feed air stream flowing in a cross flow configuration, synthesis gas will be produced provided the requisite steam and natural gas based feed stream are fed to the process side. Sufficient thermal coupling or heat transfer between the heat-releasing ceramic oxygen transport membrane tubes and the heat-absorbing catalyst containing reformer tubes must be enabled within the design of the assemblies or modules and the arrangement of multiple modules in an array. Generally, from about 75% and 85% of the heat transfer between the ceramic oxygen transport membrane tubes and the adjacent reformer tubes is through the radiation mode of heat transfer whereby surface area, surface view factor, surface emissivity, and non-linear temperature difference between the tubes, i.e. $T_{otm}^4 - T_{reformer}^4$, are critical elements to the thermal coupling. Surface emissivity and temperatures are generally dictated by tube material and reaction requirements. The surface area and radiation view factor are generally dictated by tube arrangement or configuration within each module and the entire reactor. While there are numerous tube arrangements or configurations that could meet the thermal coupling requirements between the oxygen transport membrane tubes and the reformer tubes, a key challenge is to achieve a relatively high production rate per unit volume which, in turn, depends on the amount of active oxygen transport membrane area contained within the unit volume. An additional challenge to achieving the optimum thermal coupling performance is to ascertain and optimize the size of the ceramic oxygen transport membrane tubes and the catalyst containing reformer tubes, and more particular the effective surface area ratio, $A_{reformer}/A_{otm}$, of the respective tubes. Of course, such performance optimization must be balanced against the manufacturability, costs, as well as the reliability, maintainability, operating availability of the modules and reactor.

The preferred arrangement of oxygen transport membrane tubes is a panel arrangement comprising a plurality of straight rows oxygen transport membrane tubes adjacent to a second panel arrangement comprising plurality of straight rows of catalyst containing reformer tubes. This multiple panel arrangement of oxygen transport membrane tubes and catalyst containing reformer tubes improves the surface area ratio, view factor and radiative heat transfer efficiency between the different tubes. Due to the improved view factor between oxygen transport membrane tubes and reforming tubes, the net tube count and overall tube area of the reforming tubes may be reduced by a factor of 30% to 40% compared to prior art oxygen transport membrane reactors. In addition, with a reduction in reforming tube diameter, the required wall thickness to resist creep rupture at the operating temperatures and pressures may be reduced which, coupled with tube count reductions results in significant cost reduction.

The improved oxygen transport membrane module design which includes an oxygen transport membrane panel and an adjacent reformer panel allows for the significant advantages associated with linear row tube arrangement or co-planar tube arrangement and with reduced diameter reforming tubes. The illustrated oxygen transport membrane module design has the additional advantages of being inherently modular and expandable which enables commercial-scale applications without losing efficiency.

The preferred coupling arrangement for any final form of the ceramic tubular membrane elements is referred to as a 'hairpin' arrangement created by adjoining two tubular membrane elements together in pairs with a 180 degree elbow fitting on one end. This 'hairpin' arrangement also represents a repeating unit of the ceramic oxygen transport membrane element. Employing the 'hairpin' or two-pass or other multi-pass arrangement also allows for creating higher capacity repeating units by adjoining multiple tubes together using ceramic connectors to create additional effective length of the active ceramic oxygen transport membrane elements.

A similarly constructed second panel may be constructed from catalytic reformer tubes or repeating units. In this case, the reforming tube or housing is constructed using metal tubing or pipe preferably made from a suitable wrought material like Incoloy 800HT. A continuous length of 0.75 inch tubing or 0.5 NPS pipe can be bent to form two parallel legs and a 180-degree turn at one end. This two parallel leg arrangement provides a multi-pass reforming of the feed that intensifies the reforming process while maintaining excellent thermally coupling with the adjacent radiant heat generating oxygen transport membrane tubes. As seen in the drawings, the catalytic reforming tubes are configured as a serpentine tube, or more preferably a U-shaped tube, containing steam methane reforming catalysts and the reactors are arrayed in cross-flow arrangement with the air stream. This two pass flow design provides more residence time, increases surface area and serves to improve the radiative view factor between the oxygen transport membrane and catalytic reforming reactors.

The oxygen transport membrane panel assembly and the catalytic reformer panel assembly are preferably stacked or nested together to form a dual panel module with the rows of oxygen transport membrane tubes disposed juxtaposed or adjacent to the rows of catalytic reformer tubes. One or more of these dual panel modules may be stacked together to form an array of oxygen transport membrane tubes interleaved with an array of catalytic reformer tubes. This array has a characteristically high view factor between the oxygen transport membrane tubes and catalytic reformer tubes and a relatively low number of catalytic reformer tubes required to achieve thermal balance. In the preferred array, there is preferably between about two and four, and more preferably three or four oxygen transport membrane tubes per catalytic reformer tube. The inlet and exit manifolds for the oxygen transport membrane panel and the inlet and exit manifolds for the catalytic reformer panel are preferably on opposite sides of the combined panel or dual panel module when fully assembled. This arrangement facilitates simplified manifold connections as well as a reduced thickness and tighter array for the combined panel or dual panel module.

The combination of an oxygen transport membrane panel and a catalytic reformer panel into a dual panel module forms a basic modular unit of oxygen transport membrane based reforming reactor. Coupling or integrating multiple dual panel modules increases processing capacity and thus synthesis gas production capacity. For any application of the oxygen transport membrane based reforming reactor, the exact panel size and number of dual panel modules may be chosen to best fit the requirements. However, most practical applications of the oxygen transport membrane based reforming reactor may require a large number of panels. To that end, an additional level of integration and modularization comprises: multiple dual panel modules stacked within a refractory-lined steel container or housing and manifolded together to form an easily installed and connected oxygen transport membrane based reforming reactor pack assembly. Advantageously, these oxygen transport membrane based reforming reactor pack assemblies can be produced or fabricated in a shop and transported to the plant site for installation. In addition, these multiple module pack assemblies facilitate simplified handling, connecting, and servicing for plant personnel as they are easily installed or removed.

For example, one or more of the dual panel modules can be stacked together in a refractory lined housing to form the core of a pack assembly. From six and twenty dual panel modules are preferably stacked within each pack assembly. The housing is preferably a carbon steel structure that provides an open window areas to allow air or other oxygen containing stream to flow across the oxygen transport membrane tubes and through the dual panel modules. The housing also has refractory lining partially surrounding the stacked dual panel modules and configured to provide thermal insulation between the high temperature region containing the dual panel modules panels and a dedicated section or zone of the pack assembly configured to contain the inlet circuit, outlet circuit and recycle circuit. The pack assembly housing also provides the structural support, access panels, lift points, etc. The multiple dual panel modules within a pack assembly are typically manifolded together within the pack assembly in the dedicated section or zone of the pack assembly, preferably located above or on top of the dual panel modules. This dedicated section or zone preferably includes an inlet circuit is configured or adapted to provide a mixed-preheated-feed (e.g. natural gas and steam) to the feed manifolds associated with the catalyst reformer panels and oxygen transport membrane panels and an outlet circuit configured or adapted to receive and withdraw the synthesis gas produced in the catalyst containing reformer panels.

Each of oxygen transport membrane based reforming reactor pack assembly is envisioned to slide into a hot box or furnace segment. These furnace segments may be produced individually and connected together in series to form an oxygen transport membrane furnace train. Alternatively, a single long hot box or furnace configured to accept multiple oxygen transport membrane based reforming reactor pack assemblies may be fabricated and shipped to the plant or constructed on site. In either embodiment, the oxygen transport membrane based reforming reactor packs are generally installed in series in the oxygen transport membrane furnace train. Multiple oxygen transport membrane furnace trains may be arranged in parallel to form a large-scale oxygen transport membrane based synthesis gas subsystem.

Similar to the oxygen transport membrane based reforming reactor, the oxygen transport membrane based boiler reactor is also preferably constructed in a modular or panel array type arrangement. The oxygen transport membrane boiler reactor is arranged in a modular fashion integrating oxygen transport membrane arrays or panels and separate steam generator tube arrays or panels. The arrays or panels are connected generally in a parallel orientation (although non-parallel arrangements can be employed) and can be increased in size or quantity to accommodate larger boiler capacities. The arrays or panels are preferably housed in an insulated hot-air duct with a common feed water drum arranged in a cooler zone and a common steam drum arranged in a separate zone. Process gas connections are arranged on one side of the reactor, making the other side accessible for maintenance. The integrated packing arrangement of oxygen transport membrane tubes and steam tubes provides for efficient heat transfer and provides similar advantages with respect to packing density, modularization, low cost manufacturing, shop-fab modules, and scalability as the above-described modular oxygen transport membrane based reforming reactor assemblies.

Oxygen Transport Membrane Based Integrated Combined Cycle

Figure 2:
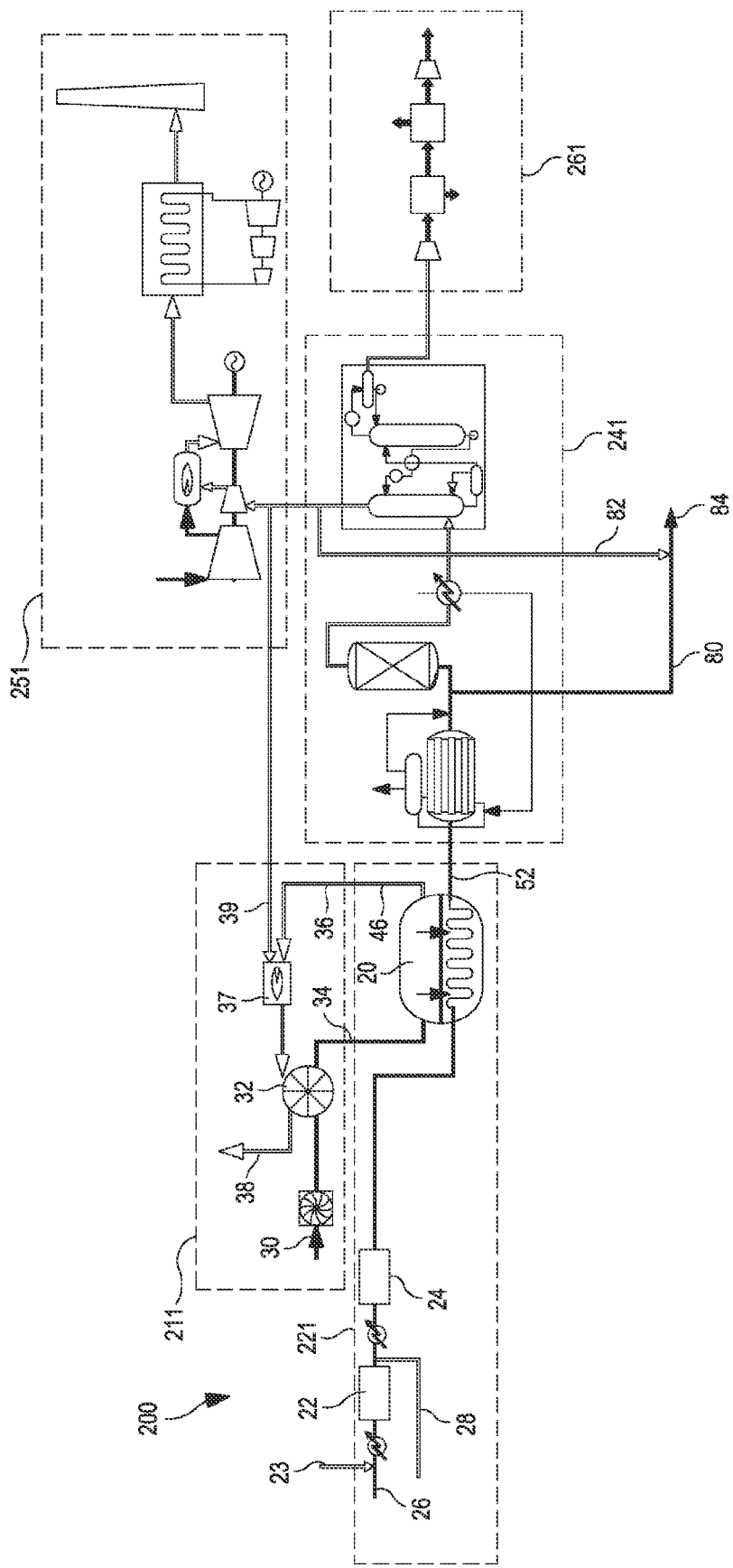
FIG. 2 shows a schematic illustration of a method and system containing an oxygen transport membrane based reforming reactor, a gas turbine and a steam turbine to produce electric power.

FIG. 2 is a block diagram illustrating a carbon capture enabled oxygen transport membrane based integrated combined cycle system 200 for producing electric power. The system 200 comprises an air supply and preheating subsystem 211; an oxygen transport membrane based synthesis gas subsystem 221; a synthesis gas conditioning subsystem 241; an integrated combined cycle power generation subsystem 251 comprising a gas turbine configured to combust a hydrogen-rich fuel and a steam turbine; and a carbon dioxide purification unit or subsystem 261.

The air supply and preheating subsystem 211 is similar in many respects to the air supply and preheating subsystem 111 of FIG. 1 and comprises the same underlying components such as air blower, regenerative heat exchanger, and duct burner. However, the subsystem 211 is appropriately sized and fluidly coupled to provide heated feed air stream 34 to the oxygen transport membrane based synthesis gas subsystem 221 and receive the residual heated oxygen-depleted stream 36 from the oxygen transport membrane based synthesis gas subsystem 221.

The oxygen transport membrane based synthesis gas subsystem 221 is also similar in many respects to the oxygen transport membrane based synthesis gas subsystem 111 utilizing one or more of the reactor designs and modularization described above. However, the subsystem 221 is configured to convert greater than about 90%, in another embodiment greater than about 95% of the methane in the feed stream 28 to reforming products and enable greater than 90% carbon capture. The preferred reactor design is the Combined Reforming Reactor I, with or without secondary reforming.

Synthesis Gas Conditioning Subsystem

The synthesis gas conditioning subsystem 241 employs known water gas shift reactors, acid gas removal units, and heat recovery components to produce hydrogen or hydrogen-rich gas to fuel a gas turbine in the integrated combined cycle power generation subsystem 251.

Like many integrated coal gasification combined cycle (IGCC) systems, the present integrated oxygen transport membrane combined cycle system and process includes a water-gas shift reactor to generate additional hydrogen and carbon dioxide via the Water Gas Shift reaction:

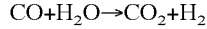
$CO+H_2O \rightarrow CO_2+H_2$

Since the Water Gas Shift reaction is exothermic, the shifted synthesis gas leaves the shift reactor at a temperature greater than the directly cooled synthesis gas, and preferably at a temperature of around 435° C. A portion of the sensible energy in this shifted stream is preferably recovered by preheating or reheating boiler feed water or by preheating the natural gas and hydrogen feed stream. Although not shown, a portion of the shifted synthesis stream may be recycled back to the oxygen transport membrane feed streams to adjust the $H_2/CO$ of the synthesis gas feed. The shifted synthesis gas is then directed to the acid gas removal (AGR) process to strip carbon dioxide from the shifted synthesis gas.

A known AGR process such as the Selexol™ process commercially offered by UOP, LLC, utilizes a solvent generally comprising a mixture of the dimethyl ethers of polyethylene glycol that dissolves or absorbs the acid gases such as carbon dioxide from the conditioned synthetic gas at relatively high pressure, usually about 300 psia to 1000 psia. The rich solvent containing the carbon dioxide gas is then stripped to release and recover the carbon dioxide gas. The stripped carbon dioxide gas is directed to a carbon purification unit (CPU) 261 while the remaining hydrogen-rich gas effluent is directed to the integrated combined cycle power generation subsystem 251. The Selexol™ process is preferred for the present integrated oxygen transport membrane combined cycle process as it provides good selectivity for carbon dioxide over hydrogen contained within the synthesis gas and minimizes the need for hydrogen purification.

The CPU subsystem 261 is configured to purify the carbon dioxide containing effluent stream and produce a purified carbon dioxide-rich stream suitable for carbon dioxide capture and storage/sequestration (CCS) processing or direct use in processes such as enhanced oil recovery. In the illustrated embodiment, the CPU subsystem first compresses the carbon dioxide-rich effluent stream to roughly 375 psia in a multi-stage compression train. The compressed carbon-dioxide-rich stream is dried in a carbon dioxide dryer which is adapted to remove excess moisture and water through a temperature swing adsorption process thereby preventing or reducing corrosion of the gas handling components. The CPU subsystem also is configured to remove undesirable impurities such as mercury and selected acids from the carbon dioxide-rich stream and may also include an auto-refrigerative process for inert removal. A typical auto-refrigerative process purifies the carbon dioxide stream to about 95% or greater purity with 97% recovery of carbon dioxide. This cryogenic based process also produces a vent stream which is enriched in atmospheric gases (e.g., $N_2$, $O_2$, Ar). The purified carbon dioxide-rich effluent stream is then further compressed to about 2000 psia.

Integrated Combined Cycle Subsystem

The integrated combined cycle subsystem 251 is configured to generate electric power from both a hydrogen fueled gas turbine or hydrogen-rich gas fueled turbine and from steam turbine generators, as is known by those skilled in the art. If an externally produced higher pressure syngas (not shown in FIG. 2) such as from a coal gasification system or from a partial oxidation system is processed in the oxygen transport membrane based reforming subsystem 221 or the synthesis gas conditioning subsystem 241 to provide additional hydrogen or hydrogen-rich fuel then that gas may be first expanded and could serve as a source of additional power.

Gas turbines available from manufacturers like GE and Siemens typically need only minor modifications to use a hydrogen-rich synthesis gas as the fuel while further changes or modifications may be required to the gas turbine where hydrogen fuel is the preferred choice of fuel. Most of the sensible heat in the hot gas turbine exhaust gas is recovered in the heat recovery steam generator (HRSG) where it produces steam that drives a steam turbine in a manner or arrangement well known to those persons skilled in the art.

While the performance and overall efficiency of the synthesis gas fueled or hydrogen fueled gas turbine may be lower than comparable natural gas fueled gas turbines due to the low heating values of synthesis gas based fuels and associated temperature limitations in the synthesis gas fueled gas turbines, the environmental advantages and ability to capture and sequester carbon dioxide (i.e. CCS enabled) are notable.

Oxygen Transport Membrane and Coal Gasification System Integrations

Figure 3:
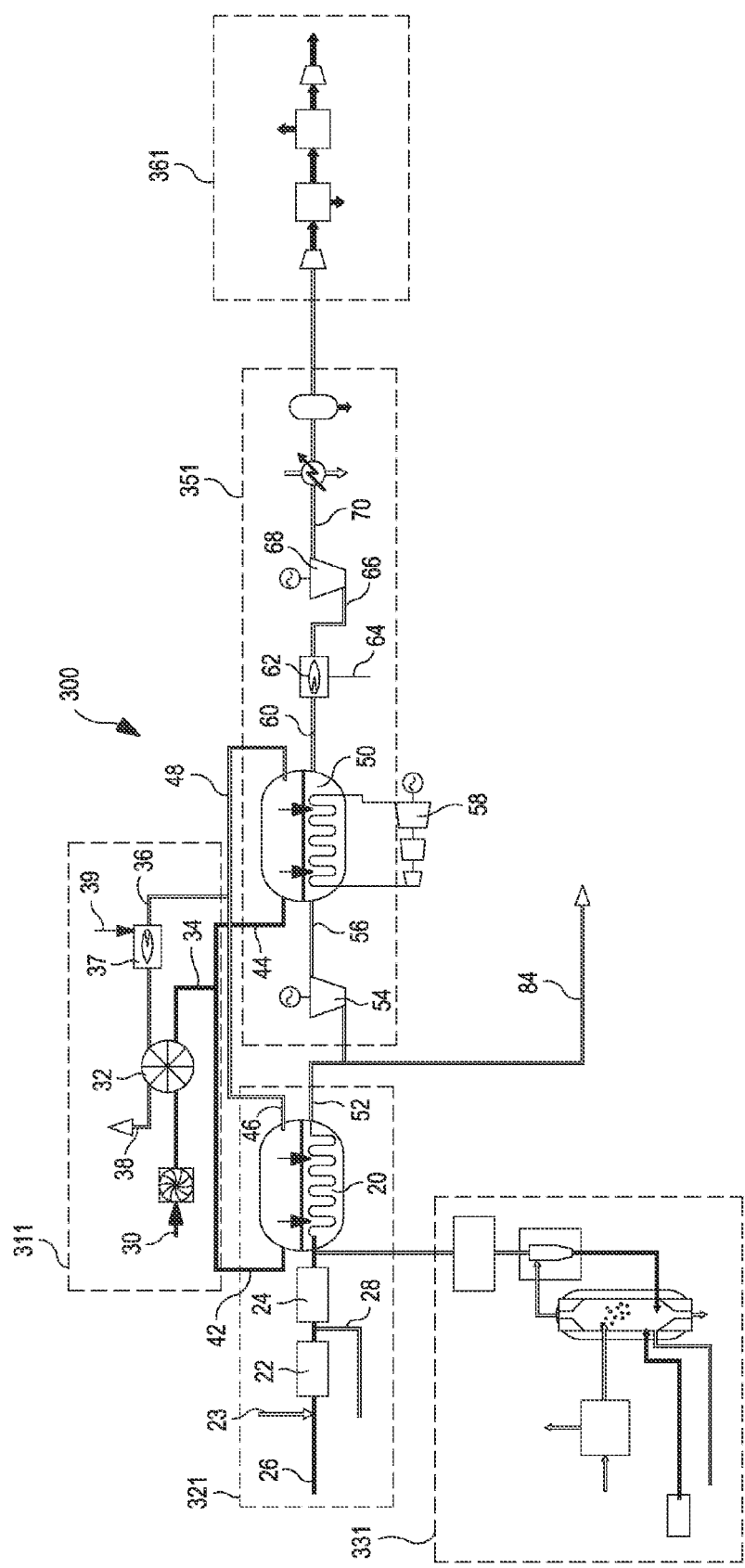
FIG. 3 shows a schematic illustration of a method and hybrid system for producing a electric power from a mixture of a coal-derived synthesis gas and a synthesis gas produced from an oxygen transport membrane based reforming reactor in accordance with yet another of the present invention.

FIG. 3 shows a schematic illustration of yet another embodiment of the present method and system that utilizes both coal-derived synthesis gas and natural gas-derived synthesis gas. The natural gas-derived synthesis gas is produced by reforming natural gas in an oxygen transport membrane based reforming reactor. The system 300 shown in FIG. 3 is similar to the system 100 shown in FIG. 1 except for the additional coal gasification subsystem 331. The air supply and preheating subsystem 311; an oxygen transport membrane based synthesis gas subsystem 321; a power generation subsystem 351 comprising an oxygen transport membrane based boiler and a steam turbine; and a carbon dioxide purification unit or subsystem 361 utilize similar underlying components as those in system 100 of FIG. 1; however, the components are sized and designs appropriately modified to utilize coal-derived syngas.

Figure 4:
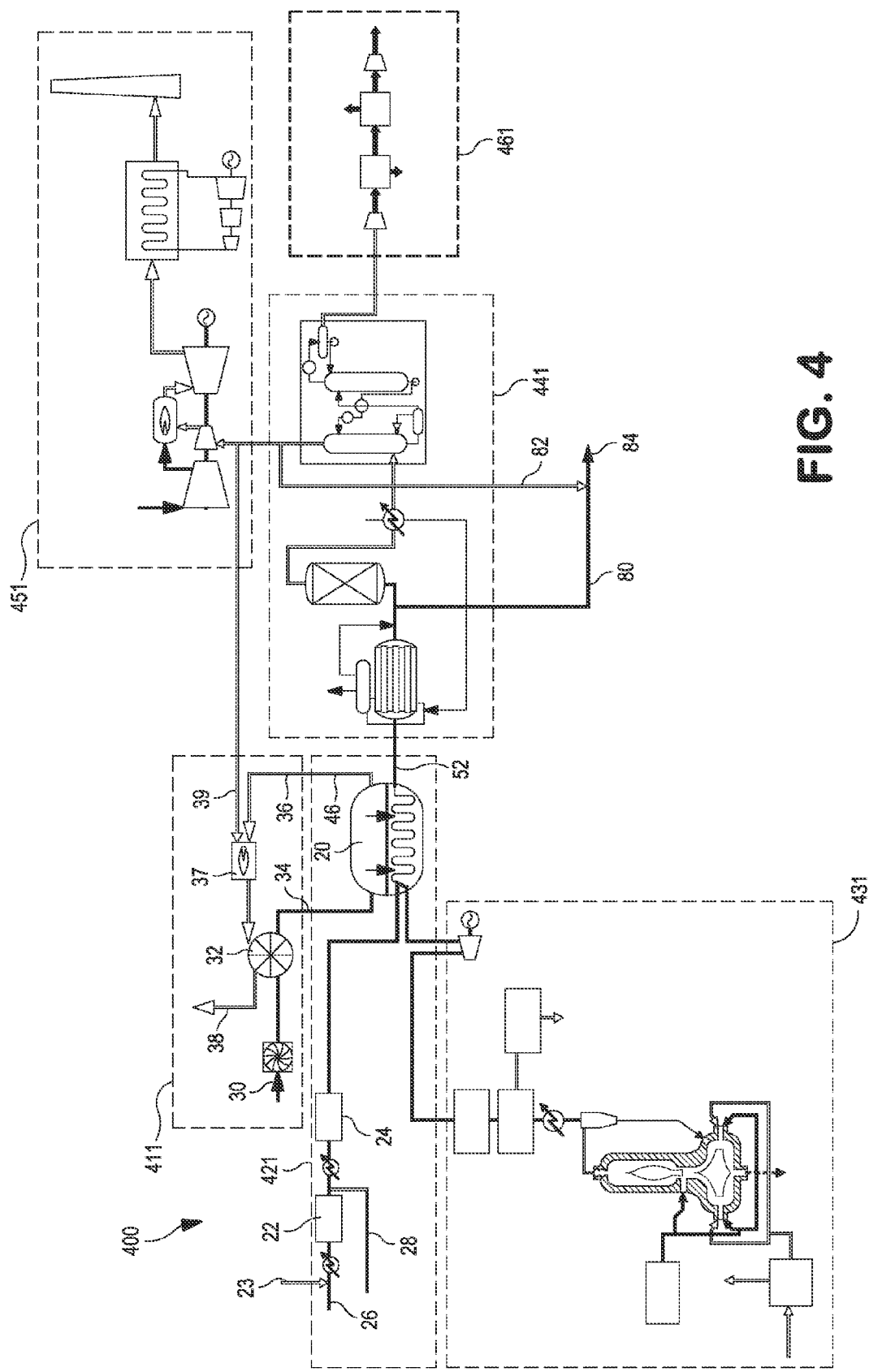
FIG. 4 shows yet another embodiment of the present method and hybrid system for producing a fuel/liquid product and electric power using a combination of coal-derived synthesis gas and an oxygen transport membrane based reforming reactor.

FIG. 4 shows a schematic illustration of yet another embodiment of the present method and system that utilizes both coal-derived synthesis gas and natural gas-derived synthesis gas. The natural gas-derived synthesis gas is produced by reforming natural gas in an oxygen transport membrane based reforming reactor. The system 400 shown in FIG. 4 is similar to the system 200 shown in FIG. 2 except for the additional coal gasification subsystem 431. The air supply and preheating subsystem 411; an oxygen transport membrane based synthesis gas subsystem 421; synthesis gas conditioning subsystem 441; integrated combined cycle power generation subsystem 451 comprising a hydrogen fueled or hydrogen-rich gas fueled gas turbine and a steam turbine; and a carbon dioxide purification unit or subsystem 461 utilize similar underlying components as those in system 200 of FIG. 2; however, the components are sized and designs appropriately modified to utilize coal-derived syngas.

Coal Gasifier Subsystem

The systems 300 and 400 contemplate the use of conventional coal gasification technologies. In a typical coal gasification subsystem, a pulverized coal feedstock 10 is fed to a gasification unit 12 along with steam 14 and oxygen 16 supplied from a cryogenic air separation unit 18. In the disclosed embodiments, the cryogenic air separation unit 18 is preferably a commercially available low purity, low to intermediate pressure air separation unit, known to those persons skilled in the art of cryogenic air separation plants, although more complex air separation units can be employed to meet other industrial gas requirements of the plant or facility.

In practice, the coal gasification unit 12 may comprise a single coal gasification reactor or a plurality of reactors connected in a series of stages which collectively achieve the desired coal gasification, that is, the formation of a coal-derived synthesis gas stream 19. Preferably, the coal gasification unit 12 is an entrained flow, fixed bed, or fluidized bed coal gasifier. In the coal gasification process, the steam and oxygen injected into the coal beds result in the partial oxidation of the coal at temperatures between about 1400° F. and 2600° F. and pressures of from about 300 psia to about 1000 psia. At these high temperatures and pressurized conditions, the molecular bonds of coal and steam are broken down, releasing a raw synthesis gas stream that contains at least hydrogen and carbon monoxide and which also typically contains other substances such as carbon dioxide, water vapor, hydrocarbons, volatilized tars, particulate matter, and sulfides. The portions of the coal feedstock which are not transformed into raw synthesis gas may become a slag material that resembles glass, sulfur byproducts or ammonia. There is also some ash generally formed in the coal gasifier which is removed later in the gasification process. The tars, oils, phenols, ammonia and water co-products are preferably condensed from the raw synthesis gas stream and purified, as appropriate. The synthesis gas is then directed to a filter or cleaning area where further impurities are removed. The resulting coal-derived synthesis gas is typically at a temperature of from about 1000° F. to about 1800° F. and at a pressure of from about 300 psia to about 1000 psia.

The embodiments presented in this invention are applicable for all types of coal gasifiers—entrained flow, fluidized bed and fixed/moving bed gasifiers. The preferred gasifier type for this invention is one which generates a gasifier syngas with high methane slip. This is typically the case with fluidized bed and fixed bed gasifiers and may be achievable with some entrained flow gasifiers. Operating pressures for coal gasifiers typically range from 300 to 1500 psig and more typically from 500 to 1100 psig. Coal may be fed in dry particulate form or may be mixed with water and fed as a slurry to the gasifier.

The coal-derived synthesis gas may require a pretreatment subsystem for $H_2S$ and COS control that is disposed downstream of the coal gasifier and upstream of the oxygen transport membrane based reforming reactor or converter.

The preferred coal-derived synthesis gas pretreatment process is solvent-based (MDEA) sulfur removal process, although a warm gas cleanup process using a solid regenerable sorbent may alternatively be used.

Even though systems 300 and 400 shown in FIGS. 3 and 4, respectively depict the coal-derived syngas introduced into the oxygen transport membrane based synthesis gas subsystem 321 or 421, other variants such as feeding all or a portion of the coal-derived syngas to the synthesis gas conditioning subsystem 341 or 441 are within the scope of the present methods and systems to produce power.

Although not shown in detail, the oxygen transport membrane based synthesis gas subsystems 300 and 400 can be configured to further heat the coal-derived syngas indirectly or directly. Also the oxygen transport membrane based reforming reactors 20 in these systems can be configured to further reform the methane in coal-derived syngas either separately or mixed with natural gas.

Even though system 100, 200, 300, and 400 in FIGS. 1 through 4, respectively show all of the synthesis gas produced in the respective oxygen transport membrane based synthesis gas subsystem serving as a source of fuel to generate electricity, it is possible to size these systems appropriately and withdraw a portion of the synthesis gas to make liquid fuels, methanol, hydrogen, and other chemicals in a separate facility or a facility integrated with these systems.

INDUSTRIAL APPLICABILITY

As outlined in Table 1 below, each of the embodiments shown and described with reference to FIGS. 1-4 are particularly suitable for use with selected embodiments of the oxygen transport membrane based reforming reactor designs disclosed in the United States patent applications published as US2014/0319424; US2014/0323598; and US2014/0319427; the disclosures of which are incorporated by reference herein. In addition, the quality and characteristics of the synthesis gas produced in each of the embodiments of the oxygen transport membrane based reforming reactors disclosed in these published patent applications would likely dictate the final system configuration and, in particular, the liquid/fuel production facilities that could also be served by the different embodiments of the overall system.

TABLE 1

| | Carbon Source | | Power Subsystem Config | | OTM Reforming Reactor Config | | |
|---|---|---|---|---|---|---|---|
| | Natural Gas | Coal | OTM Boiler, Steam Turbine | H2 or H2-rich gas fueled Gas Turbine, Steam Turbine | OTM Combined Reforming Reactor I (US 2014/0319424) | OTM Combined Reforming Reactor II (US 2014/0323598) | OTM Recycle Reforming Reactor (US 2014/0319427) |
| FIG. 1 | Yes | No | Yes | No | Yes | No | Yes |
| FIG. 2 | Yes | No | No | Yes | Yes | Yes | No |
| FIG. 3 | Yes | Yes | Yes | No | Yes | No | Yes |
| FIG. 4 | Yes | Yes | No | Yes | Yes | Yes | No |

COMPARATIVE EXAMPLES

Tables 2 thru 4 summarize a modeled comparison of a conventional coal based advanced power cycle against the proposed oxygen transport membrane (OTM) based power cycle using a system configuration as generally shown in FIG. 1.

TABLE 2

Prior Art Coal Based Power System (US 2014/0183866)

| Stream | Unit | Coal Syngas | Syngas to OTM Boiler | Residual Syngas | Hot Flue Gas | Warm Flue Gas |
|---|---|---|---|---|---|---|
| Stream # | | 71 | 27 | 36 | 38 | 40 |
| Temperature | F. | 1010 | 1317 | 1563 | 2738 | 365 |
| Pressure | psia | 340 | 38.9 | 17.2 | 17 | 15 |
| Flow | k lb/hr | 767 | 767 | 1305 | 1421 | 1448 |
| Composition | | | | | | |
| H2 | mol % | 30.0% | 30.0% | 5.0% | 0.0% | 0.0% |
| CO | mol % | 51.0% | 51.0% | 8.0% | 0.0% | 0.0% |
| CH4 | mol % | 3.0% | 3.0% | 1.0% | 0.0% | 0.0% |
| CO2 | mol % | 4.0% | 4.0% | 48.0% | 54.0% | 53.0% |
| H2O | mol % | 9.0% | 9.0% | 38.0% | 43.0% | 42.0% |
| O2 | mol % | 0.0% | 0.0% | 0.0% | 1.0% | 1.0% |
| N2 + AR | mol % | 2.0% | 2.0% | 1.0% | 2.0% | 4.0% |

TABLE 3

OTM Natural Gas Reforming/OTM Boiler Power Generation Configuration (FIG. 1)

| Stream | Unit | NG Syngas | Syngas to Boiler | Residual Syngas | Hot Flue Gas | Warm Flue Gas |
|---|---|---|---|---|---|---|
| Stream # | | 52 | 56 | 60 | 66 | 70 |
| Temperature | F. | 1800 | 1305 | 1563 | 1742 | 1299 |
| Pressure | psia | 403 | 108.7 | 93.7 | 93.7 | 24.7 |
| Flow | k lb/hr | 660 | 660 | 1110 | 1180 | 1180 |
| Composition | | | | | | |
| H2 | mol % | 46.8% | 46.8% | 5.5% | 0.0% | 0.0% |
| CO | mol % | 15.9% | 15.9% | 1.4% | 0.0% | 0.0% |
| CH4 | mol % | 0.7% | 0.7% | 0.0% | 0.0% | 0.0% |
| CO2 | mol % | 6.1% | 6.1% | 20.9% | 22.1% | 22.1% |
| H2O | mol % | 30.2% | 30.2% | 71.9% | 76.5% | 76.5% |
| O2 | mol % | 0.0% | 0.0% | 0.0% | 1.0% | 1.0% |
| N2 + AR | mol % | 0.3% | 0.3% | 0.3% | 0.3% | 0.3% |

For the same net power delivered of about 558 MW, the current OTM based natural gas power system concept provides clear advantages compared to conventional or prior art coal derived synthesis gas based power systems, of the type disclosed in United States patent application publication US 2014/0183866.

TABLE 4

| | Prior Art Coal Based Power System (US 2014/0183866) | OTM Natural Gas Reforming/ OTM Boiler Power Generation Configuration (FIG. 1) |
|---|---|---|
| POWER PRODUCTION (MW) | | |
| Steam Cycle | 624 | 511 |
| Expander 1 | 38 | 57 |
| Expander 2 | 38 | 64 |
| Total Gross Power (MW) | 700 | 632 |
| Auxiliary Loads (MW) | | |
| Cryogenic ASU | 45.6 | 9.6 |
| CO2 Compression/Purification | 54.2 | 25.8 |
| Supplementary Oxygen from ASU | 11.5 | 13.4 |
| Other loads | 29.7 | 24.0 |
| Total Auxiliary Load | 142 | 74 |
| Fired Duty (MW) | 1461 | 1160 |

TABLE 4-continued

| | Prior Art Coal Based Power System (US 2014/ 0183866) | OTM Natural Gas Reforming/ OTM Boiler Power Generation Configuration (FIG. 1) |
|---|---|---|
| Net Power (MW) | 558 | 558 |
| Net Efficient (% HHV) | 38.2% | 48.1% |
| Coal (Tons/day) | 5130 | 0 |
| Natural Gas (MMSCFD) | 0 | 94.1 |
| Industrial Gases | | |
| Oxygen -Cryo ASU (Tons/day) | 3974 | 838 |
| Oxygen - OTM ASU (Tons/day) | 6462 | 7541 |
| Oxygen from Cryogenic ASU (%) | 38.1% | 10% |
| CO2 Captured (Tons/day) | 11806 | 5607 |
| CO2 Emissions (Tons/day) | 687 | 311 |
| CO2 Capture Efficiency (%) | 97.1% | 97.1% |

Such cost and performance advantages of the current oxygen transport membrane based natural gas power subsystem and process include: (i) 26% increase in net efficiency at same rated power (i.e. 48.1% HHV vs 38.2% HHV for prior art coal-derived synthesis gas advanced power system); (ii) over 50% reduction on overall carbon dioxide produced at same rated power (i.e. CO2 captured plus CO2 emissions of 5918 tpd vs 12493 tpd); (iii) similar carbon dioxide capture levels of about 97.1%; (iv) almost 80% less cryogenic oxygen used (i.e. 838 tpd vs 3974 tpd of cryogenic oxygen, which translates into lower capital and operating costs for the much smaller air separation unit required in the current oxygen transport membrane based natural gas power subsystem and process; and (v) no requirement for the warm gas clean-up or DRSP units in the current oxygen transport membrane based natural gas power subsystem and process.

The oxygen transport membrane based synthesis gas subsystem with integrated gas turbine and steam turbine combined cycle shown in FIG. 2 and FIG. 4 was also modeled. Several cases were run and the results are summarized in Table 5.

oxygen, the electrical efficiency increases, the $H_2/CO$ ratio of the syngas increases, and the number of OTM tubes, or modules increases to support the increased oxygen demand. At a 70/30 natural gas/coal feed by input fuel heating value, syngas $H_2/CO$ ratio is at 2.0 which is ideal for making liquid co-product with FT synthesis. As natural gas is added relative to coal, the number of tubes increases reaching a maximum for the natural gas only case. If full OTM oxy-combustion power cycle is selected, then the number of OTM tubes dramatically goes up to support the full oxy-combustion requirements.

TABLE 5

| Power Plant | Coal Feed (% HHV) | NG Feed (% HHV) | Coal Feed vs base | Cryo $O_2$ vs base | Electrical Efficiency (HHV) | $CO_2$ capture | $CO_2$ vs base | $CO_2$ capture per unit power (lbm/MW-hr) | OTM $O_2$ (sTPD) | OTM Tubes (1000's) | $H_2/CO$ Preshift |
|---|---|---|---|---|---|---|---|---|---|---|---|
| 1. IGCC no capture | 100% | 0% | 78% | 72% | 40% | 0% | 0% | 0 | 0 | 0 | |
| 2. IGCC w/capture | 100% | 0% | 100% | 100% | 31% | 90% | 100% | 1970 | 0 | 0 | |
| 3. OTM Coal APC w/capture | 100% | 0% | 82% | 81% | 38% | 97% | 90% | 1765 | 6362 | 2185 | |
| 4. OTM IGCC w/capture | 100% | 0% | 73% | 61% | 43% | 92% | 75% | 1477 | 326 | 90 | 0.9 |
| 5. OTM IG-NGCC w/capture | 75% | 25% | 52% | 43% | 45% | 92% | 63% | 1251 | 820 | 225 | 1.2 |
| 6. OTM IG-NGCC w/capture | 50% | 50% | 33% | 27% | 46% | 92% | 53% | 1046 | 1261 | 346 | 1.6 |
| 7. OTM IG-NGCC w/capture | 30% | 70% | 19% | 16% | 48% | 92% | 46% | 897 | 1580 | 434 | 2.0 |
| 8. OTM NGCC w/capture | 0% | 100% | 0% | 0% | 50% | 92% | 35% | 695 | 2010 | 552 | 2.8 |
| 9. OTM NG APC w/capture | 0% | 100% | 0% | 17% | 47% | 97% | 42% | 836 | 7404 | 2543 | 2.9 |
| 10. NGCC w/capture | 0% | 100% | 0% | 0% | 43% | 91% | 43% | 846 | 0 | 0 | |
| 11. NGCC no capture | 0% | 100% | 0% | 0% | 50% | 0% | 0% | 0 | 0 | 0 | |

In Table 5, rows 1, 2, 10 and 11 represent expected performance for conventional power plants for coal and natural gas with and without capture. The IGCC (Integrated Gasifier Combined Cycle) is a coal-fired plant with the shift/AGR/GT method of capture, and the NGCC (Natural Gas Combined Cycle) is natural gas fired gas-turbine (GT) with a flue gas post capture system. These represent base technology that is well studied and documented in the art. Rows 3-9 are OTM-enabled power cycles with carbon ($CO_2$) isolation and/or capture. These cases feature an OTM syngas system reacting the methane containing feedstreams from the coal gasifier and/or natural gas. Rows 3 and 9 represent predicted performance for coal OTM advanced power cycle (APC) and natural gas OTM advanced power cycle (APC), respectively. These power cycles feature an OTM boiler power system (full-oxycombustion) power cycle for carbon capture. Rows 4 through 8 represent predicted performance for OTM enabled power systems featuring the shift/AGR/GT method of carbon isolation and capture. They are referred to as OTM IGCC for a coal only case, OTM IG-NGCC for a mixed natural gas and coal fuel feed, and OTM NGCC for a natural gas only case. In all cases where OTM is used, there is an advantage in cycle efficiency over the best available conventional technology with carbon capture, and a slight advantage in carbon capture efficiency. When looking at the OTM coal-only cases in rows 3 and 4, there are significant cryogenic $O_2$ savings for the overall cycle vs the conventional approaches. In rows 5 through 7, as methane content in the feed is increased (in this case by adding natural gas), more cryogenic oxygen is displaced with OTM relative to the total In addition to the electric power production cases, another case was modeled in which a portion of the synthesis gas stream 52 leaving the oxygen transport membrane based synthesis gas subsystem 121 in FIG. 1 was modeled. Table 6 compares modeling results of a conventional coal to Fischer-Tropsch liquid conversion against the proposed oxygen transport membrane (OTM) based coal to Fischer-Tropsch liquid conversion with the synthesis gas produced in a system configuration as generally shown in FIG. 2. For the same liquid production of about 17,000 barrels per day, the oxygen transport membrane based natural gas plus coal to Fischer-Tropsch liquid concept provides clear cost and performance advantages compared to conventional or prior art based coal to liquid process. Such advantages of the oxygen transport membrane based natural gas plus coal to Fischer-Tropsch liquid conversion system and process include: (i) reduced carbon dioxide emissions; (ii) reduced by-product streams (e.g. sulfur, miscellaneous solids, slag, etc); and (iii) improved or optimized $H_2/CO$ ratio and lower overall oxygen use. From a capital cost perspective, an equivalent capacity oxygen transport membrane based natural gas plus coal to Fischer-Tropsch liquid conversion system would require less capital costs as it requires: (iv) smaller gasification subsystem; (v) no water-gas shift reactors, and (vi) smaller air separation unit (i.e. less oxygen required from cryogenic distillation of air). These capital costs are partially offset by capital costs associated with the proposed oxygen transport membrane based reforming reactor or synthesis gas subsystem.

TABLE 6

Comparison of Coal to FT Liquid Systems

| | Conventional Coal to FT Liquid (Prior Art) | OTM Based Coal to FT Liquid (See FIG. 2) |
|---|---|---|
| Coal (Tons/day) | 8,983 | 1,580 |
| Natural Gas (MMSCFD) | — | 149 |
| Fischer-Tropsch (FT) Liquids (BBL/day) | 17,000 | 17,000 |
| Coal Derived Syngas Flow (MMSCFD) | 625 | 110 |
| Coal Derived Syngas H2/CO ratio | 0.42 | 0.42 |
| Coal Derived Syngas H2/CO ratio after Water-Gas Shift | 1.80 | — |
| OTM NG based Syngas Flow (MMSCFD) | — | 510 |
| OTM NG based Syngas H2/CO ratio | — | 2.56 |
| Combined Syngas H2/CO ratio | 1.80 | 2.18 |
| Oxygen to Coal Gasifier (Tons/day) | 7,960 | 1,400 |
| Oxygen from OTM Reactors (Tons/day) | — | 5,060 |
| Sulfur (Tons/day) | 250 | 44 |
| Misc solids, slag etc. (Tons/day) | 1,689 | 297 |
| CO2 (Tons/day) | 13,143 | 2,960 |
| CO2 emissions from processing (lb CO2/gal) | 36.8 | 8.3 |
| CO2 emissions from processing & combustion (lb CO2/gal) | 55.7 | 27.2 |

While the inventions herein disclosed have been described by means of specific embodiments and processes associated therewith, numerous modifications and variations can be made thereto by those skilled in the art without departing from the scope of the invention as set forth in the appended claims or sacrificing all of its features and advantages.

The invention claimed is:

1. An oxygen transport membrane based power generation system comprising:
an oxygen transport membrane based combined reforming subsystem configured to produce a hydrogen-rich, high pressure synthesis gas stream from a hydrocarbon containing feed stream and steam; and
an oxygen transport membrane based power cycle subsystem comprising an oxygen transport membrane based boiler reactor configured to produce steam, electric power, and a carbon dioxide containing effluent by combusting the hydrogen-rich, high pressure synthesis gas stream at a pressure at least two times that of ambient pressure in the oxygen transport membrane based boiler reactor, wherein said system additionally comprises:
a first expansion stage for the generation of electric power, wherein said first expansion stage is configured to expand the hydrogen-rich, high pressure synthesis gas stream to an intermediate pressure prior to introducing said intermediate pressure, hydrogen-rich synthesis gas into the oxygen transport membrane based boiler reactor to combust said intermediate pressure, hydrogen-rich synthesis gas to generate or heat steam from a boiler feed stream passing through thermally coupled adjacent steam tubes within the oxygen transport membrane based boiler reactor, and
a second expansion stage for the generation of electric power, wherein said second expansion stage comprises a gas turbo expander configured to expand the carbon dioxide containing effluent exiting the oxygen transport membrane based boiler reactor.

2. The oxygen transport membrane based power generation system of claim 1 wherein said boiler reactor is configured to combust the high pressure, hydrogen-rich synthesis gas by reaction with oxygen permeating across the oxygen transport membrane elements within the oxygen transport membrane boiler reactor to form an effluent having a heating value less than 100 Btu/scf.

3. The oxygen transport membrane power generation system of claim 1 wherein said boiler reactor is configured to combust the high pressure, hydrogen-rich synthesis gas by reactions with oxygen permeating across the oxygen transport membrane elements within the oxygen transport membrane boiler reactor to form an effluent containing less than about 10% hydrogen.

4. The oxygen transport membrane power generation system of claim 1 further comprising a coal gasification subsystem configured to produce a coal-derived, high pressure synthesis gas stream from a source of coal, steam and oxygen produced from cryogenic distillation of air.

5. The oxygen transport membrane power generation system of claim 4 configured to heat the coal-derived, high pressure synthesis gas stream in the oxygen transport membrane based synthesis gas subsystem prior to introduction in the oxygen transport membrane boiler reactor, or first heat and chemically react methane and other hydrocarbons present in the coal-derived, high pressure synthesis gas in the oxygen transport membrane based synthesis gas subsystem prior to introduction in the oxygen transport membrane boiler reactor.

6. The oxygen transport membrane power generation system of claim 1 or claim 4 configured to provide a synthesis gas feed stream to a catalytic liquid fuel or chemical production subsystem wherein the synthesis gas feed stream is derived from coal-derived, high pressure synthesis gas stream produced in a coal gasification subsystem or hydrogen-rich, high pressure synthesis gas stream produced in an oxygen transport membrane based synthesis gas subsystem, or combinations thereof.

7. A hybrid oxygen transport membrane based power generation system comprising:
a coal gasification subsystem configured to produce a coal-derived, high pressure synthesis gas stream from a source of coal, steam and oxygen produced from cryogenic distillation of air;
an oxygen transport membrane based reforming subsystem configured to produce a reformed hydrogen-rich, high pressure synthesis gas stream from a hydrocarbon containing feed stream and steam;
an oxygen transport membrane based power cycle subsystem comprising an oxygen transport membrane based boiler reactor configured to produce steam, electric power, and a carbon dioxide containing effluent by combusting a first synthesis gas feed stream at a pressure at least two times that of ambient pressure in the oxygen transport membrane based boiler reactor, wherein said system additionally comprises:
a first expansion stage for the generation of electric power, wherein said first expansion stage is configured to expand the hydrogen-rich, high pressure synthesis gas stream to an intermediate pressure prior to introducing said intermediate pressure, hydrogen-rich synthesis gas into the oxygen transport membrane based boiler reactor to combust said intermediate pressure, hydrogen-rich synthesis gas to generate or heat steam from a boiler feed stream passing through thermally coupled adjacent steam tubes within the oxygen transport membrane based boiler reactor, and a second expansion stage for the generation of electric power, wherein said second expansion stage comprises a gas turbo expander configured to expand the carbon dioxide containing effluent exiting the oxygen transport membrane based boiler reactor;

wherein said first synthesis gas feed stream comprises the coal-derived, high pressure synthesis gas stream, or the reformed hydrogen-rich high pressure synthesis gas stream or a combination of both the coal-derived, high pressure synthesis gas stream and the reformed hydrogen-rich high pressure synthesis gas stream.

8. The hybrid system of claim 7 configured to provide a second synthesis gas feed stream to produce a fuel product or liquid product or hydrogen wherein the second synthesis gas stream comprises a portion of the coal-derived, high pressure synthesis gas stream, or a portion of the reformed hydrogen-rich, high pressure synthesis gas stream or a combinations of both the coal-derived, high pressure synthesis gas stream and the reformed hydrogen-rich high pressure synthesis gas stream.

9. A carbon capture enabled oxygen transport membrane based power generation system comprising:
an oxygen transport membrane based synthesis gas subsystem configured to treat a methane containing feed stream to form a hydrogen-rich effluent stream wherein the oxygen transport membrane based synthesis gas subsystem further comprises
an oxygen transport membrane reforming reactor configured to react the methane containing feed stream with oxygen provided across the membrane from an oxygen containing feed stream and steam to form the hydrogen-rich effluent stream;
a gas conditioning subsystem configured to treat the hydrogen-rich effluent stream to produce a hydrogen or a hydrogen-rich fuel gas and a carbon dioxide rich effluent stream; and
an integrated power generation subsystem comprising an air-blown gas turbine configured to be fueled by the hydrogen-rich fuel gas to generate electricity and a gas turbine exhaust stream at elevated temperature; a heat recovery steam generator configured to raise steam by recovering heat from the gas turbine exhaust stream; and a steam turbine configured to generate electricity utilizing steam generated in the heat recovery steam generator.

10. The carbon capture enabled oxygen transport membrane based power generation system of claim 9, wherein said oxygen transport membrane based synthesis gas subsystem is configured to convert greater than about 90% of the methane in the feed stream to reaction products comprising hydrogen, carbon-monoxide, carbon-dioxide, and steam.

11. The carbon capture enabled oxygen transport membrane based power generation system of claim 9 wherein the oxygen transport membrane synthesis gas subsystem is configured to convert greater than 95% of methane in the methane containing feed stream to the reaction products comprising hydrogen, carbon-monoxide, carbon-dioxide, and steam.

12. The carbon capture enabled oxygen transport membrane based power generation system of claim 9 wherein said oxygen transport membrane based synthesis gas subsystem comprises an oxygen transport membrane based reactor comprising (i) a plurality of tubular ceramic oxygen transport membranes configured to transport oxygen ions from an oxygen containing stream present at the outside surface of the tubular ceramic oxygen transport membranes to the interior surface or permeate side of the tubular ceramic oxygen transport membranes; and (ii) a plurality of catalyst containing reformer tubes disposed adjacent or juxtaposed relationship with the ceramic oxygen transport membrane tubes and configured to produce synthesis gas from the methane containing feed stream in the presence of a reforming catalyst and heat produced from the tubular ceramic oxygen transport membranes, wherein at least one of said tubular oxygen transport membranes is configured to further reform any hydrocarbon gas in the reformed synthesis gas stream and produce a synthesis gas product stream.

13. The carbon capture enabled oxygen transport membrane based power generation system of claim 12 wherein said at least one tubular oxygen transport membrane configured to further reform any hydrocarbon gas in the reformed synthesis gas stream contains one or more reforming catalysts.

14. The carbon capture enabled oxygen transport membrane based power generation system of claim 9 further comprising a coal gasification subsystem configured to produce a coal-derived synthesis gas stream from a source of coal, steam and a first oxygen stream, wherein the first oxygen stream is provided from a source that separates oxygen from air at cryogenic temperature, and wherein the coal-derived synthesis gas stream input into the oxygen transport membrane based synthesis gas subsystem contains at least 5.0 volume % hydrocarbons and the hydrogen-rich effluent stream contains less than about 2.0 volume % hydrocarbons.

15. The carbon capture enabled oxygen transport membrane based power generation system of claim 9 wherein a nitrogen rich stream is introduced to the hydrogen or hydrogen-rich fuel gas exiting the gas conditioning subsystem as a diluent, prior to introducing said fuel gas to the gas turbine.

16. The carbon capture enabled oxygen transport membrane based power generation system of claim 9 wherein said oxygen transport membrane based synthesis gas subsystem comprises at least one duct burner, wherein a portion of the hydrogen or hydrogen-rich fuel gas exiting the gas conditioning subsystem is fed to said at least one duct burner for combustion to produce supplemental heat in order to preheat the oxygen containing feed stream.

17. The carbon capture enabled oxygen transport membrane based power generation system of claim 14 wherein said oxygen transport membrane based synthesis gas subsystem is configured to convert greater than about 90% of the methane in the coal-derived synthesis gas to reaction products comprising hydrogen, carbon-monoxide, carbon-dioxide, and steam.

18. The carbon capture enabled oxygen transport membrane based power generation system of any one of claim 10, 11 or 17 wherein said oxygen transport membrane based synthesis gas subsystem is configured to enable greater than about 90% of the carbon in said feed stream to be captured in a gas conditioning system.

19. The carbon capture enabled oxygen transport membrane based power generation system of claim 9 wherein said carbon dioxide rich effluent stream is directed to a carbon dioxide purification subsystem configured to purify said carbon dioxide rich effluent stream and produce a purified carbon dioxide rich stream suitable for storage, sequestration, processing and/or direct use.

* * * * *